(12) United States Patent
Miyazaki et al.

(10) Patent No.: US 8,706,693 B2
(45) Date of Patent: Apr. 22, 2014

(54) MAP UPDATE DATA DELIVERY METHOD, MAP UPDATE DATA DELIVERY DEVICE AND TERMINAL DEVICE

(75) Inventors: Yukio Miyazaki, Hitachinaka (JP); Osamu Tomobe, Mito (JP); Yukihiro Kawamata, Hitachi (JP); Takayuki Uchida, Yokohama (JP); Tadashi Kamiwaki, Ibaraki (JP); Shigeru Matsuo, Hitachinaka (JP)

(73) Assignee: Clarion Co., Ltd., Saitama-shi (JP)

( * ) Notice: Subject to any disclaimer, the term of this patent is extended or adjusted under 35 U.S.C. 154(b) by 554 days.

(21) Appl. No.: 13/009,200

(22) Filed: Jan. 19, 2011

(65) Prior Publication Data

US 2011/0179080 A1 Jul. 21, 2011

(30) Foreign Application Priority Data

Jan. 20, 2010 (JP) ................... 2010-009617

(51) Int. Cl.
*G06F 7/00* (2006.01)
*G01C 21/00* (2006.01)

(52) U.S. Cl.
USPC ............................ 707/624; 707/695; 701/450

(58) Field of Classification Search
USPC .......... 707/772, 919, 638, 999.203, 695, 624, 707/646, E17.018; 701/532, 533, 450
See application file for complete search history.

(56) References Cited

U.S. PATENT DOCUMENTS

| 7,974,959 | B2* | 7/2011 | Sawai et al. ................... 707/695 |
| 8,249,801 | B2* | 8/2012 | Sakai et al. ................... 701/408 |
| 8,392,367 | B2* | 3/2013 | Moribe et al. ................ 707/634 |
| 2001/0019309 | A1* | 9/2001 | Saeki et al. ................... 340/995 |
| 2004/0117110 | A1 | 6/2004 | Sasajima |
| 2004/0193370 | A1* | 9/2004 | Umezu et al. ................. 701/210 |
| 2006/0173613 | A1* | 8/2006 | Iwahori ......................... 701/208 |
| 2007/0124064 | A1* | 5/2007 | Fukui et al. ................... 701/208 |
| 2007/0126605 | A1* | 6/2007 | Aleksic et al. ........... 340/995.14 |
| 2007/0244636 | A1* | 10/2007 | Horikami ...................... 701/208 |

(Continued)

FOREIGN PATENT DOCUMENTS

| CN | 101501452 | * | 9/2007 | ............ G01C 21/32 |
| JP | 2002-32773 A | | 1/2002 | |

(Continued)

OTHER PUBLICATIONS

Chinese Office Action dated Dec. 14, 2012 w/ English translation (fifteen (15) pages).

(Continued)

*Primary Examiner* — Robert Timblin

(74) *Attorney, Agent, or Firm* — Crowell & Moring LLP

(57) ABSTRACT

A map update data delivery method includes: storing update unit data compiled in correspondence to each set of update data used to update map data in a specific version to map data in another version for a map element by incorporating update data for another map element that must also be updated in coordination with a change made for the map element; searching for base update data needed to update a map data for a map element designated as an update target in a map area specified at a terminal as a map data update target; searching for related update data with a relation to contents of update data included in the base update data searched; and transmitting the base update data and the related update data to the terminal.

13 Claims, 24 Drawing Sheets

(56) References Cited

U.S. PATENT DOCUMENTS

| | | | |
|---|---|---|---|
| 2009/0019095 A1* | 1/2009 | Asahara et al. | 707/203 |
| 2009/0171976 A1 | 7/2009 | Obara et al. | |
| 2009/0248758 A1* | 10/2009 | Sawai et al. | 707/203 |

FOREIGN PATENT DOCUMENTS

| JP | 2004-178248 A | 6/2004 |
|---|---|---|
| JP | 2005-265574 A | 9/2005 |
| JP | 2006-317643 A | 11/2006 |
| JP | 2007-93904 A | 4/2007 |
| JP | 2008-89852 A | 4/2008 |
| JP | 2008-261767 A | 10/2008 |
| WO | WO 2008/044584 A1 | 4/2008 |

OTHER PUBLICATIONS

Extended European Search Report Dated May 17, 2013 {Ten (10) Pages}.

Japanese Office Action dated May 15, 2012 with English translation (six (6) pages).

* cited by examiner

FIG. 6

ATOMIC MAP UPDATER RELATION TABLE

| BASE ATOMIC MAP UPDATER ID | RELATED ATOMIC MAP UPDATER ID | RELATION TYPE |
|---|---|---|
| A1 | A2 | CATEGORY RELATION |
| A2 | A1 | CATEGORY RELATION |
| ⋮ | ⋮ | ⋮ |
| A201 | A232 | NAME RELATION |
| A201 | A330 | ROAD LINK RELATION |
| ⋮ | ⋮ | ⋮ |
| A232 | A201 | NAME RELATION |
| ⋮ | ⋮ | ⋮ |
| A330 | A201 | ROAD LINK RELATION |
| A330 | A331 | ROAD LINK RELATION |
| A331 | A330 | ROAD LINK RELATION |
| ⋮ | ⋮ | ⋮ |

FIG. 7

ROAD LINK RELATION TABLE

| BASE LINK ID | RELATED LINK ID |
|---|---|
| ⋮ | ⋮ |
| L4 | L91 |
| L4 | L92 |
| L4 | L93 |
| L5 | L91 |
| L5 | L92 |
| L5 | L93 |
| ⋮ | ⋮ |
| L91 | L4 |
| L91 | L5 |
| L92 | L4 |
| L92 | L5 |
| L93 | L4 |
| L93 | L5 |
| ⋮ | ⋮ |

FIG. 8

CATEGORY RELATION TABLE

| BASE FACILITY CATEGORY | RELATED FACILITY CATEGORY |
|---|---|
| 61 (LEISURE FACILITY) | 63 (ACCOMMODATION) |
| 30 (SPORTS FACILITY) | 50 (SPORTING-GOODS SHOP) |
| 64 (SUPERMARKET) | 62 (HARDWARE STORE) |
| ⋮ | ⋮ |
| 63 (ACCOMMODATION) | 61 (LEISURE FACILITY) |
| 62 (HARDWARE STORE) | 64 (SUPERMARKET) |
| ⋮ | ⋮ |

FIG. 9

ATOMIC MAP GENERATOR MANAGEMENT TABLE

| ATOMIC MAP UPDATER ID (902) | ATOMIC MAP UPDATER Ver (903) | ATOMIC MAP UPDATER AFFILIATE AREA ID (904) | ATOMIC MAP UPDATER COORDINATES (905) | ATOMIC MAP UPDATER TEXT INFORMATION (906) | CHILD DIFFERENCE OBJECT ID (907) | ATOMIC INTERNAL NAME DATA (908) | ATOMIC INTERNAL LINK ID (909) | ATOMIC INTERNAL CATEGORY ID (910) |
|---|---|---|---|---|---|---|---|---|
| A1 | 2 | 2 | x_A1 y_A1 | sum=INSERT UMIBE TENNIS CLUB &size=512B | D1, D2 | UMIBE TENNIS CLUB | L0 | 30 (SPORTS FACILITY) |
| A2 | 2 | 3 | x_A2 y_A2 | sum=INSERT MEGASPORTS &size=256B | D3 | MEGASPORTS | — | 50 (SPORTING -GOODS SHOP) |
| ... | ... | ... | ... | ... | ... | ... | ... | ... |
| A201 | 3 | 5 | x_A201 y_A201 | sum=INSERT YAMANAKA ENTRANCE/EXIT &size=1024B | D1001, D1002, D1003, D1004, D1005, D1006, D1007, D1008, D1009, D1010 | TOMEI EXPRESS HIGHWAY NATIONAL ROAD ROUTE 1 YAMANAKA ENTRANCE/EXIT | L1, L2, L3, L4, L5, L6, L7, L8 | — |
| ... | ... | ... | ... | ... | ... | ... | ... | ... |
| A232 | 3 | 9 | x_A232 y_A232 | sum=UPDATE NOHARA INTERSECTION ROAD SIGNPOST &size=128B | D1053 | TOKYO YOKOHAMA TOMEI | — | — |
| ... | ... | ... | ... | ... | ... | ... | ... | ... |
| A330 | 3 | 6 | x_A330 y_A330 | sum=INSERT NANBOKU ROAD &size=512B | D2051, D2052, D2053, D2054, D2055, D2056, D2057 | NANBOKU ROAD SOUTH STREET NORTH STREET | L73, L74, L75, L76, L91, L92, L93 | — |
| ... | ... | ... | ... | ... | ... | ... | ... | ... |

FIG. 10

DIFFERENCE OBJECT MANAGEMENT TABLE

| 1002 DIFFERENCE OBJECT ID | 1003 PARENT ATOMIC MAP UPDATER ID | 1004 DIFFERENCE OBJECT Ver | 1005 TARGET MAP OBJECT ID | 1006 MAP OBJECT OPERATION TYPE | 1007 MAP OBJECT AFFILIATE TABLE | 1008 MAP OBJECT AFFILIATE AREA ID | 1009 DIFFERENCE OBJECT INTERNAL NAME DATA | 1010 DIFFERENCE OBJECT INTERNAL LINK ID | 1011 DIFFERENCE OBJECT INTERNAL CATEGORY ID |
|---|---|---|---|---|---|---|---|---|---|
| D1 | A1 | 2 | L0 | DEL | ROAD LINK TBL | 2 | — | L0 | — |
| D2 | A1 | 2 | P1 | INS | POI FACILITY TBL | 2 | UMIBE TENNIS CLUB | — | 30 (SPORTS FACILITY) |
| D3 | A2 | 2 | P2 | INS | POI FACILITY TBL | 3 | MEGASPORTS | — | 50 (SPORTING-GOODS SHOP) |
| ... | ... | ... | ... | ... | ... | ... | ... | ... | ... |
| D1001 | A201 | 3 | L2 | DEL | ROAD LINK TBL | 5 | — | L2 | — |
| D1002 | A201 | 3 | L6 | INS | ROAD LINK TBL | 5 | TOMEI | L6, L1, L7, L8 | — |
| D1003 | A201 | 3 | L1 | UPD | ROAD LINK TBL | 5 | TOMEI | L1, L6 | — |
| D1004 | A201 | 3 | L7 | INS | ROAD LINK TBL | 5 | TOMEI | L7, L6, L8, L3 | — |
| D1005 | A201 | 3 | L3 | UPD | ROAD LINK TBL | 5 | TOMEI | L3, L7 | — |
| D1006 | A201 | 3 | L8 | INS | ROAD LINK TBL | 5 | — | L8, L6, L7, L4, L5 | — |
| D1007 | A201 | 3 | L4 | UPD | ROAD LINK TBL | 5 | NATIONAL ROAD ROUTE 1 | L4, L5, L8 | — |
| D1008 | A201 | 3 | L5 | UPD | ROAD LINK TBL | 5 | NATIONAL ROAD ROUTE 1 | L5, L4, L8 | — |
| D1009 | A201 | 3 | G1 | INS | GUIDANCE INFORMATION TBL | 5 | YAMANAKA ENTRANCE/EXIT | L7, L8 | — |
| D1010 | A201 | 3 | N8 | INS | NODE INFORMATION TBL | 5 | YAMANAKA ENTRANCE/EXIT | — | — |
| ... | ... | ... | ... | ... | ... | ... | ... | ... | ... |
| D1053 | A232 | 3 | G16 | UPD | GUIDANCE INFORMATION TBL | 9 | TOKYO, YOKOHAMA, TOMEI | — | — |
| ... | ... | ... | ... | ... | ... | ... | ... | ... | ... |
| D2051 | A330 | 3 | L91 | INS | ROAD LINK TBL | 6 | NANBOKU ROAD | L91, L75, L76, L92 | — |
| D2052 | A330 | 3 | L75 | UPD | ROAD LINK TBL | 6 | SOUTH STREET | L75, L76, L91 | — |
| D2053 | A330 | 3 | L76 | UPD | ROAD LINK TBL | 6 | SOUTH STREET | L76, L75, L91 | — |
| D2054 | A330 | 3 | L92 | INS | ROAD LINK TBL | 6 | NANBOKU ROAD | L92, L91, L93 | — |
| D2055 | A330 | 3 | L93 | INS | ROAD LINK TBL | 6 | NANBOKU ROAD | L93, L92, L73, L74 | — |
| D2056 | A330 | 3 | L73 | UPD | ROAD LINK TBL | 6 | NORTH STREET | L73, L74, L93 | — |
| D2057 | A330 | 3 | L74 | UPD | ROAD LINK TBL | 6 | NORTH STREET | L74, L73, L93 | — |
| ... | ... | ... | ... | ... | ... | ... | ... | ... | ... |

FIG. 11

ROAD DIFFERENCE OBJECT TABLE 1101

| DIFFERENCE OBJECT ID 1102 | DIFFERENCE OBJECT Ver 1103 | MAP OBJECT OPERATION TYPE 1104 | ROAD LINK ID 1105 | ROAD LINK AFFILIATE AREA ID 1106 | ROAD TYPE 1107 | ROAD NAME 1108 | START POINT NODE ID 1109 | START POINT NODE-SIDE ADJACENT LINK ID 1110 | END POINT NODE ID 1111 | END POINT NODE-SIDE ADJACENT LINK ID 1112 | LINK LENGTH 1113 |
|---|---|---|---|---|---|---|---|---|---|---|---|
| D1 | 2 | DEL | L0 | 2 | — | — | — | — | — | — | — |
| ... | ... | ... | ... | ... | ... | ... | ... | ... | ... | ... | ... |
| D1001 | 3 | DEL | L2 | 5 | — | — | — | — | — | — | — |
| D1002 | 3 | INS | L6 | 5 | EXPRESS HIGHWAY | TOMEI | N2 | L1 | N8 | L7, L8 | 20m |
| D1003 | 3 | UPD | L1 | 5 | EXPRESS HIGHWAY | TOMEI | — | — | — | L6 | — |
| D1004 | 3 | INS | L7 | 5 | EXPRESS HIGHWAY | TOMEI | N8 | L6, L8 | N3 | L3 | 21m |
| D1005 | 3 | UPD | L3 | 5 | EXPRESS HIGHWAY | TOMEI | — | L7 | — | — | — |
| D1006 | 3 | INS | L8 | 5 | NARROW ROAD | — | N8 | L6, L7 | N6 | L4, L5 | 25m |
| D1007 | 3 | UPD | L4 | 5 | NATIONAL ROAD | NATIONAL ROAD ROUTE 1 | — | — | — | L5, L8 | — |
| D1008 | 3 | UPD | L5 | 5 | NATIONAL ROAD | NATIONAL ROAD ROUTE 1 | — | L4, L8 | — | — | — |
| ... | ... | ... | ... | ... | ... | ... | ... | ... | ... | ... | ... |
| D2051 | 3 | INS | L91 | 6 | CITY ROAD | NANBOKU ROAD | N85 | L75, L76 | N89 | L92 | 80m |
| D2052 | 3 | UPD | L75 | 6 | PREFECTURAL ROAD | SOUTH STREET | — | — | N85 | L76, L91 | — |
| D2053 | 3 | UPD | L76 | 6 | PREFECTURAL ROAD | SOUTH STREET | — | L75, L91 | — | — | — |
| D2054 | 3 | INS | L92 | 6 | CITY ROAD | NANBOKU ROAD | N89 | L91 | N88 | L93 | 60m |
| D2055 | 3 | INS | L93 | 6 | CITY ROAD | NANBOKU ROAD | N88 | L92 | N82 | L73, L74 | 70m |
| D2056 | 3 | UPD | L73 | 6 | PREFECTURAL ROAD | NORTH STREET | — | — | — | L74, L93 | — |
| D2057 | 3 | UPD | L74 | 6 | PREFECTURAL ROAD | NORTH STREET | — | L73, L93 | — | — | — |
| ... | ... | ... | ... | ... | ... | ... | ... | ... | ... | ... | ... |

FIG. 12

GUIDANCE INFORMATION DIFFERENCE OBJECT TABLE

| 1202 DIFFERENCE OBJECT ID | 1203 DIFFERENCE OBJECT Ver | 1204 MAP OBJECT OPERATION TYPE | 1205 GUIDANCE INFORMATION ID | 1206 GUIDANCE INFORMATION AFFILIATE AREA ID | 1207 ACCESS LINK ID | 1208 GUIDANCE POINT NODE ID | 1209 EXIT LINK ID | 1210 ROAD SIGNPOST IMAGE FILE NAME | 1211 ROAD SIGNPOST TEXT | 1212 GUIDANCE AUDIO FILE NAME | 1213 GUIDANCE AUDIO KEYWORD |
|---|---|---|---|---|---|---|---|---|---|---|---|
| ... | ... | ... | ... | ... | ... | ... | ... | ... | ... | ... | ... |
| D1009 | 3 | INS | G1 | 5 | L7 | N8 | L8 | file001 | YAMANAKA ENTRANCE/EXIT | file001 | YAMANAKA ENTRANCE/EXIT |
| ... | ... | ... | ... | ... | ... | ... | ... | ... | ... | ... | ... |
| D1053 | 3 | UPD | G16 | 9 | — | — | — | file003 | TOKYO, YOKOHAMA, TOMEI | — | — |
| ... | ... | ... | ... | ... | ... | ... | ... | ... | ... | ... | ... |

FIG. 13

POI DIFFERENCE OBJECT TABLE

| DIFFERENCE OBJECT ID | DIFFERENCE OBJECT VER | MAP OBJECT OPERATION TYPE | POI FACILITY ID | FACILITY NAME | FACILITY CATEGORY ID | FACILITY AFFILIATE AREA ID | FACILITY COORDINATES |
|---|---|---|---|---|---|---|---|
| ... | ... | ... | ... | ... | ... | ... | ... |
| D2 | 2 | INS | P1 | UMIBE TENNIS CLUB | 30 | 2 | x_P1 y_P1 |
| D3 | 2 | INS | P2 | MEGASPORTS | 50 | 3 | x_P2 y_P2 |
| ... | ... | ... | ... | ... | ... | ... | ... |

FIG. 14

POI FACILITY CATEGORY TABLE

| FACILITY CATEGORY ID | FACILITY CATEGORY NAME |
|---|---|
| ⋮ | ⋮ |
| 30 | SPORTS FACILITY |
| ⋮ | ⋮ |
| 50 | SPORTING-GOODS SHOP |
| ⋮ | ⋮ |
| 61 | LEISURE FACILITY |
| 62 | HARDWARE STORE |
| 63 | ACCOMMODATION |
| 64 | SUPERMARKET |
| ⋮ | ⋮ |

MAP UPDATE DATA DELIVERY METHOD, MAP UPDATE DATA DELIVERY DEVICE AND TERMINAL DEVICE

INCORPORATION BY REFERENCE

The disclosure of the following priority application is herein Incorporated by reference: Japanese Patent Application No. 2010-009617 filed Jan. 20, 2010.

BACKGROUND OF THE INVENTION

1. Field of the Invention

The present invention relates to a map update data delivery technology.

2. Description of Related Art

Navigation apparatuses that provide guidance for the driver by displaying the current vehicle position on a map and retrieving, through a search, route information indicating a route to a destination have become increasingly common in recent years. Such a navigation apparatus holds map data, provided in blocks corresponding to the areal size of unit display areas for map display at the navigation apparatus, which enable the navigation apparatus to display the current position, execute route search and provide route guidance.

The navigation apparatus may obtain the map data in a recording medium such as a DVD (Digital Versatile Disc) or a recording device such as an HDD (Hard Disk Drive), or may download the map data via a communication network as is increasingly the case. However, the actual road network constantly changes with the construction of new roads, the closure of old roads, and changes in POI (Point Of Interest) information (facility information). For this reason, the user is able to perform a difference update of necessary map element data alone by selecting a specific data block as an update target so as to reflect the latest road conditions in the map data after the initial map data acquisition.

However, when the map element data in the data block selected by the user alone are updated in the difference map update, the map data integrity may be compromised. For instance, if a road, the data for which have been modified, extends beyond the selected block and only the data in the selected block are updated, the road may be discontinuous between the selected block and a block that has not been selected. Japanese Laid Open Patent Publication No. 2008-89852 addresses this issue by disclosing a technology for maintaining data integrity by correlating map blocks adjacent to one another and updating the data in another block if an update of the data in one block compromises the map integrity.

In addition, Japanese Laid Open Patent Publication No. 2006-317643 discloses a technology for maintaining the data integrity for sets of data that are referenced with one another by updating another set of data in the referential relationship as well if an exclusive update of a set of data may compromise the data integrity, in order to ensure that the map data do not become inconsistent through a difference update. Namely, the publication discloses a technology for integrating a series of update operations for maintaining the data integrity as a single transaction.

SUMMARY OF THE INVENTION

The technologies disclosed in Japanese Laid Open Patent Publication No. 2008-89852 and Japanese Laid Open Patent Publication No. 2006-317643 make it possible to maintain map data format integrity by sustaining the data integrity of map data assuming a referential relationship whereby sets of map data are correlated. However, sets of actual map data that do not have a direct referential relationship may have a semantic relation to one another. Yet, the consistency between such sets of data that have a semantic relation to one another even though they do not have a referential relationship is not taken into consideration in the technologies of the related art.

For instance, there may be semantic consistency between road link data for a highway entrance/exit and guidance information data that contain information on a road guide signpost installed at a regular road intersection located at a geographic point away from the highway entrance/exit. Information indicating the names of places to which roads running along various directions reach and the like, brought up on display at the navigation apparatus for route guidance, is provided on the road guide signpost.

When a new highway entrance/exit opens, a new road guide signpost providing information on intersections of major roads in the surrounding area and information on the highway entrance/exit itself will be erected, or relevant information will be added on an existing signpost by updating the signpost in the real world. Under such circumstances, a road link corresponding to the new highway entrance/exit will be added in the map data and guidance information corresponding to the actual road guide signpost will be added into the map data or existing guidance information will be updated. However, no referential relationship between the road link data representing the highway entrance/exit and the information on the road guide signpost erected to provide guidance to the highway entrance/exit is defined in the map data format. Namely, while the guidance information constituted with the road guide signpost data is bound with the road link data for the regular road intersection, i.e., while the guidance information and the road link data have a referential relationship, the guidance information is not bound with the road link data for the highway entrance/exit, i.e., the guidance information does not have a referential relation with the road link data for the highway entrance/exit.

This means that when a technology whereby another set of map data that should also be updated at the same time is ascertained simply by focusing on sets of map data in a direct referential relationship to one another, as in the case of the technologies disclosed in Japanese Laid Open Patent Publication No. 2008-89852 and Japanese Laid Open Patent Publication No. 2006-317643, is adopted, the road link data representing the highway entrance/exit and the guidance information data for the signpost providing guidance with regard to the highway entrance/exit may not be designated as simultaneous update targets.

In neither of the technologies in the related art described above, the road link data representing the highway entrance/exit and the guidance information data for the signpost providing guidance with regard to this highway entrance/exit will both be designated as update target data as long as both sets of data are included in the area corresponding to the update target block selected by the user. However, it is not uncommon to erect a signpost providing guidance with regard to a highway entrance/exit at a point distanced by several km or more from the highway entrance/exit. This means that the area corresponding to the update target block selected by the user may not always contain both the road link data representing the new highway entrance/exit and the guidance information data for all the signposts providing guidance with regard to the particular highway entrance/exit. Under such circumstances, the road link data and the guidance information data will not be simultaneously updated through either of the technologies in the related art described above, leading to an undesirable situation in which the contents of guidance provided by using the map become inconsistent even if the data integrity within the map data format is sustained.

According to the 1st aspect of the present invention, a map update data delivery method comprises: storing, in an update unit data storage unit of a map update system that updates map data at a terminal, update unit data compiled in correspondence to each set of update data used to update map data in a specific version to map data in another version for a map element by incorporating update data for another map element that must also be updated in coordination with a change made for the map element; searching the update unit data storage unit for base update data constituted with the update unit data needed to update a map data for a map element designated as an update target in a map area specified at the terminal as a map data update target; searching the update unit data storage unit for related update data constituted with another set of update unit data with a relation to contents of update data included in the base update data searched; and transmitting the base update data and the related update data to the terminal.

According to the 2nd aspect of the present invention, in the map update data delivery method according to the 1st aspect, it is preferred that, in the searching for the related update data, update unit data for another map element set apart from the map element corresponding to the base update data by a distance equal to or less than a predetermined distance, which include character string data identical to character string data included in the update data included in the base update data, are retrieved as the related update data associated with the base update data through search.

3. According to the 3rd aspect of the present invention, in the map update data delivery method according to the 1st aspect, it is preferred that the map update system includes a road link relation information storage unit in which a relation between a given set of road link data and another set of road link data is defined as relation information defining a relation between sets of map element data; and in the searching for the related update data, update unit data for another map element set apart from the map element corresponding to the base update data by a distance equal to or less than a predetermined distance, which include road link data related as defined in the road link relation information storage unit to road link data included in the base update data are retrieved as the related update data associated with the base update data through search.

According to the 4th aspect of the present invention, in the map update data delivery method according to the 3rd aspect, it is preferred that the map update system includes a facility category relation information storage unit in which a relation between a facility category to which a given set of facility data belongs and another facility category is defined as relation information defining a relation between sets of map element data; and in the searching for the related update data, update unit data for another map element set apart from the map element corresponding to the base update data by a distance equal to or less than a predetermined distance, which include facility data belonging to a facility category related as defined in the facility category relation information storage unit to facility data included in the base update data are retrieved as the related update data associated with the base update data through search.

According to the 5th aspect of the present invention, a map update data delivery device that transmits update data to be used to update map data at a terminal connected through a network in response to a request issued from the terminal in a map update system enabling the map data at the terminal to be updated comprises: an update unit data storage unit in which update unit data compiled in correspondence to each set of update data used to update map data in a specific version to map data in another version for a map element by incorporating update data for another map element that must also be updated in coordination with a change made for the map element, are stored; a base update data search unit that searches for base update data constituted with the update unit data needed to update a map data for a map element designated as an update target in a map area specified at the terminal as a map data update target; a related update data search unit that searches for related update data constituted with another set of update unit data with a relation to contents of the update data included in the base update data searched; and a map data delivery unit that transmits the base update data and the related update data to the terminal.

According to the 6th aspect of the present invention, in the map update data delivery device according to the 5th aspect, it is preferred that the related update data search unit retrieves through search the related update data constituted with update unit data for another map element set apart from the map element corresponding to the base update data by a distance equal to or less than a predetermined distance, which include character string data identical to character string data included in the update data constituting part of the base update data.

According to the 7th aspect of the present invention, in the map update data delivery device according to the 5th aspect, it is preferred that the map update data delivery device further comprises: a road link relation information storage unit in which a relation between a given set of road link data and another set of road link data is defined as relation information defining a relation between sets of map element data. The related update data search unit retrieves through search the related update data constituted with update unit data for another map element set apart from the map element corresponding to the base update data by a distance equal to or less than a predetermined distance, which include road link data related as defined in the road link relation information storage unit to road link data included in the base update data.

According to the 8th aspect of the present invention, in the map update data delivery device according to the 5th aspect, it is preferred that the map update data delivery device further comprises: a facility category relation information storage unit in which a relation between a facility category to which a given set of facility data belongs and another facility category is defined as relation information defining a relation between sets of map element data. The related update data search unit retrieves through search the related update data constituted with updated unit data for another map element set apart from the map element corresponding to the base update data by a distance equal to or less than a predetermined distance, which include facility data belonging to a facility category related as defined in the facility category relation information storage unit to facility data included in the base update data.

According to the 9th aspect of the present invention, a terminal device comprises: a map data acquisition unit that obtains map data in a specific version stored in a map database; and a map update processing unit that updates the map data in the specific version to map data in another version in correspondence to each map element obtained via the map data acquisition unit. The map update processing unit obtains via the map data acquisition unit update unit data compiled in correspondence to each set of update data needed to update map data for a map element by incorporating update data for another map element that also needs to be updated in coordination with a change made for the map element and updates map data by using the update unit data; and the map data acquisition unit transmits to a map center an update data verification request that includes identification information of a map area specified by a user via an input unit, as a map data update target and information indicating a version of map data stored in the map database, corresponding to the map area specified, receives an update data summary providing summary information for base update data constituted with update unit data needed to update a map element to be designated as an update target, and summary information for related update data constituted with another set of update unit data related to contents of the update data included in the base update data, accepts a user selection of specified update unit data as an update target by displaying the update data summary at a display unit, transmits an update data transmission request containing identification information enabling identification of the specified update unit data to the map center, and obtains update unit data to be used to update the map data at the map update processing unit.

According to the 10th aspect of the present invention, in the terminal device according to the 9th aspect, it is preferred that, when accepting the selection of update unit data to be designated as the update target by displaying the update data summary at the display unit, current selection states of both the base update data and the related update data, in correspondence to which the summary is displayed, are indicated at the display unit.

According to the 11th aspect of the present invention, in the terminal device according to the 9th aspect, it is preferred that the related update data are update unit data for another map element set apart from the map element corresponding to the base update data by a distance equal to or less than a predetermined distance, which include character string data identical to character string data included in update data constituting part of the base update data.

According to the 12th aspect of the present invention, in the terminal device according to the 9th aspect, it is preferred that the related update data corresponding to the summary information included in the update data summary, received in response to the update data verification request, are update unit data for another map element set apart from the map element corresponding to the base update data by a distance equal to or less than a predetermined distance, which include other road link data related as defined to road link data in the base update data for the map area specified in the update data verification request.

According to the 13th aspect of the present invention, in the terminal device according to the 9th aspect, it is preferred that the related update data corresponding to the summary information included in the update data summary, received in response to the update data verification request, are update unit data for another map element set apart from the map element corresponding to the base update data by a distance equal to or less than a predetermined distance, which include facility data belonging to another facility category related as defined to a facility category to which facility data in the base update data for the map area specified in the update data verification request belong.

BRIEF DESCRIPTION OF THE DRAWINGS

FIG. 6 shows the structure adopted in the atomic map updater relation table.
FIG. 7 shows the structure adopted in the road link relation table.
FIG. 8 shows the structure adopted in the category relation table.
FIG. 9 shows the structure adopted in the atomic map updater management table.
FIG. 10 shows the relationship adopted in the difference object management table.
FIG. 11 shows the structure adopted in the road difference object table.
FIG. 12 shows the structure adopted in the guidance information difference object table.
FIG. 13 shows the structure adopted in the POI difference object table.
FIG. 14 shows the structure adopted in the POI facility category table.

DESCRIPTION OF PREFERRED EMBODIMENTS

According to the present invention, if an onboard apparatus such as a navigation terminal device indicates a specific update verification target map block as an update request area to a map center, a base atomic map updater collecting unit 112 in the map center identifies all the atomic map updaters linked to the update request area and designates an aggregate of the identified atomic map updaters as a base atomic map updater in a first step. In a second step, a related atomic map updater collecting unit 116 in the map center identifies all the atomic map updaters that are semantically related to the base atomic map updater even though they do not have any referential relation to the base atomic map updater in the map data format and designates an aggregate of the identified atomic map updaters as a related atomic map updater. The decision as to whether or not atomic map updaters are semantically related may be made by verifying whether or not different atomic map updaters contain common, identical text information related to a name, by verifying whether or not different atomic map updaters both include road links having a specific relation which is defined in advance, e.g., a specific combination of road links such as a road link indicating the road that the user normally uses and a road link indicating a road used as a bypass, or by verifying whether or not different atomic map updaters both include facility categories having a specific relation which is defined in advance, e.g., a combination of POI facility categories indicating POI facilities expected to be used by the user alternately or successively based upon user behavior patterns. Upon designating the related atomic map updater, the map center transmits the base atomic map updater and the related atomic map updater to the onboard apparatus, and the onboard apparatus having received the base atomic map updater and the related atomic map updater incorporates the received atomic map updaters into the onboard map data. Thus, the present invention enables a map data difference update by assuring consistency among sets of data that are semantically related to one another even though a direct referential relationship among them is not defined. An embodiment for carrying out the present invention is now described in detail in reference to the drawings.

Figure 1:
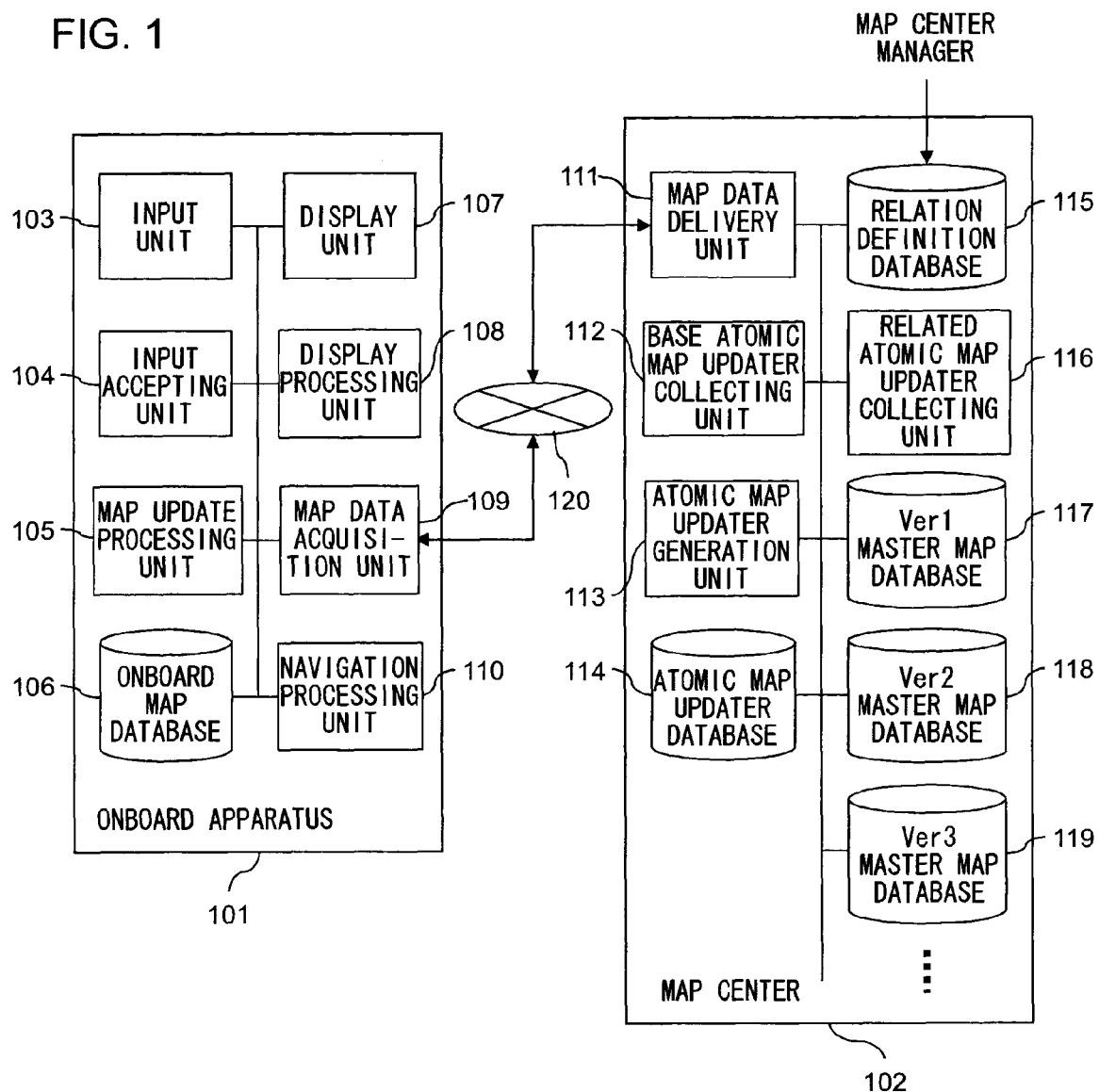
FIG. 1 is a block diagram showing the structure adopted in a map information update system achieved in an embodiment of the present invention.

The overall configuration of the map information update system achieved in an embodiment of the present invention is briefly described. FIG. 1 is a functional block diagram presenting an example of a structure that may be adopted in the map information update system in the embodiment. As FIG. 1 shows, the map information update system includes an onboard apparatus 101 and a map center 102. The onboard apparatus 101 and the map center 102 are connected via a communication network 120. Update map data to be used to update map data in the onboard apparatus 101 are transmitted from the map center 102 to the onboard apparatus 101 which then updates the map data by using the received update map data.

The map data in the map information update system are managed in units of blocks, and thus, as the user specifies a block to be updated, the map data within the specified block can be updated with the most recent map data. The following is a description of a difference update, which is a concept defining the premise of the present invention.

The map data are managed in units each representing a rectangular area, e.g., a 2 km×2 km area, and each area is managed based upon information indicating an area ID with which the particular area can be identified and an area map version. In this specification, the term "area" is used synonymously with the term "block". In the event of a difference update, the user indicates a specific update target block as an update request area to the onboard apparatus 101 and, in response, the onboard apparatus 101 informs the map center 102, which manages most recent master map data, of the update request area through the communication network 120. The map center 102 transmits update data for any map element in the update request area, the map data in the latest map version corresponding to which do not match the map data held in the onboard apparatus 101, to the onboard apparatus 101 via the communication network 120. The onboard apparatus 101 incorporates the update data into an onboard map database 106, thereby updating the map data within the update request area at the onboard map database 106 with the most recent version of the map data.

Map elements to be designated as update targets, such as individual road links and individual sets of guidance information, are referred to as map objects in this specification. A map object is constituted with a single set of map information assuming at least one specific attribute. For instance, a road link object, i.e., a map object representing a road link, is map information for a single road link, which includes attribute information made up with a plurality of sets of information such as a road link ID, an area ID of the area to which the road link belongs and a road name of the road part of which is constituted with the road link. In addition, a guidance information object, which is a map object constituted with guidance information, is map information made up with a single set of guidance information that includes as attribute information plurality of sets of information, such as a guidance information ID, an area ID of the area to which the guidance information belongs and text information indicating text on a road guide signpost erected at a guidance point.

Figure 5:
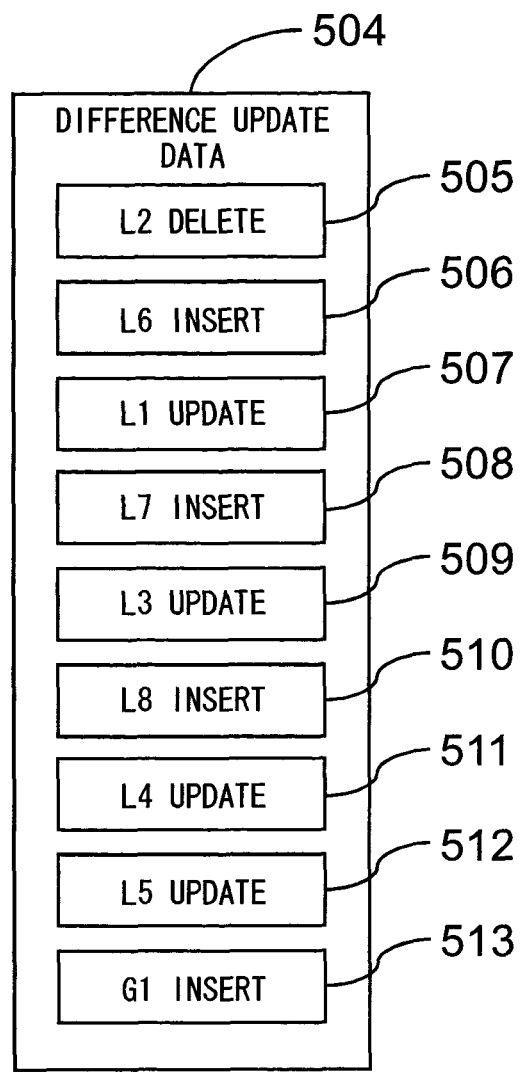
FIG. 5 presents an example of difference update data.

Update data used to execute a difference update for map data are referred to as difference update data. A given set of difference update data includes at least one "difference object" indicating a more specific update operation. A difference object is made up by combining a specification of a single map object as an update operation target with information related to an insert (INS) operation, an update (UPD) operation or a delete (DEL) operation corresponding to the map object. Difference update data 504 in the example presented in FIG. 5 are formed as an aggregate of a series of update operations including, for instance, an update operation 505 for deleting a road link L2, an update operation 506 for inserting a road link L6, an update operation 507 for modifying a road link L1, an update operation 508 for inserting a road link L7, an update operation 509 for modifying a road link L3, an update operation 510 for inserting a road link L8, an update operation 511 for modifying a road link L4, an update operation 512 for modifying a road link L5 and finally, an update operation 513 for inserting guidance information G1.

A map object may have a referential relation to another map object and, in such a case, the map data integrity in the map data format is sustained as long as the two sets of data do not contradict each other. For instance, two successive road link objects sustain data integrity in the map data format as long as attribute information "adjacent link ID" in each road link object indicates the ID of the other road link object. However, if a map update results in the attribute information "adjacent link ID" ceasing to indicate the ID of the other road link, the data integrity in the map data format becomes compromised. For this reason, in order to ensure that a difference update is executed by maintaining the map data integrity in the format map objects assuming a referential relation to each other need to be updated at the same time so as to keep the referential relationship between the map objects intact.

Difference update data define a sequence of difference objects to be used in a predetermined order without missing any, so as to enable a correct map data update. A term "atomic map updater" is used in the specification of the present invention to refer to such difference update data. A difference update is executed by using the atomic map updater as a basic unit of the difference update and, as a result, map data can be updated without creating any inconsistency. In other words, map data cannot be correctly updated if the order in which the individual difference objects within the atomic map updater are used is erroneously altered or if any difference object is skipped within the atomic map updater is skipped.

It may be necessary to use a plurality of atomic map updaters when updating the map data in a single area. In addition, an atomic map updater may be defined to cover a plurality of areas in order to update the data of a road extending through the areas without creating any inconsistency and, in such a case, a single atomic map updater may designate map objects in a plurality of areas as update targets. Accordingly, management data used to manage atomic map updaters include information related to areas designated as targets of update operations by the individual atomic map updaters.

By using atomic map updaters as described above, a difference update can be executed for map objects that have a referential relation to one another without resulting in any loss of data integrity in the map data format.

However, the data consistency of data that do not have a direct referential relation to each other but are semantically related to each other cannot be maintained by simply updating the map data with atomic map updaters. Accordingly, in the map information update system achieved in the embodiment, a specific atomic updater bound to an area specified by the user as an update target is identified. Such an atomic map updater will be referred to as a base atomic map updater in the following specification. Another atomic map updater that is semantically related to the identified based atomic map updater is then identified. This atomic map updater is to be referred to as a related atomic map updater in the following specification. The base atomic map updater and a related atomic map updater are used together as update data. With such update data, a map update can be executed by taking into consideration the consistency among data that do not have a direct referential relationship but are semantically related.

The structure of the onboard apparatus 101 is now described. As shown in FIG. 1, the onboard apparatus 101 transmits a map update request to the map center 102 via the communication network 120. The onboard apparatus 101 receives map update data transmitted from the map center 102 in response to the request, and incorporates the received map update data into the onboard map database 106. The onboard apparatus 101 includes an input unit 103, an input accepting unit 104, a map update processing unit 105, the onboard map database 106, a display unit 107, a display processing unit 108, a map data acquisition unit 109 and a navigation processing unit 110.

Figure 2:
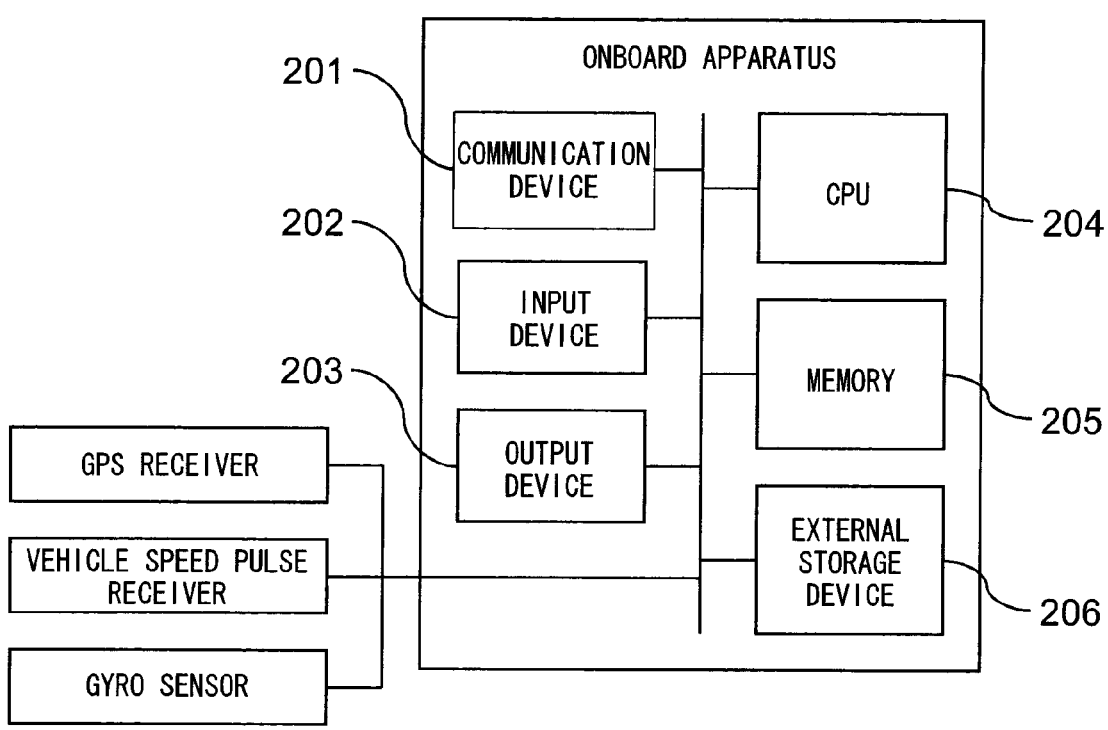
FIG. 2 shows the structure of an onboard apparatus.
Figure 3:
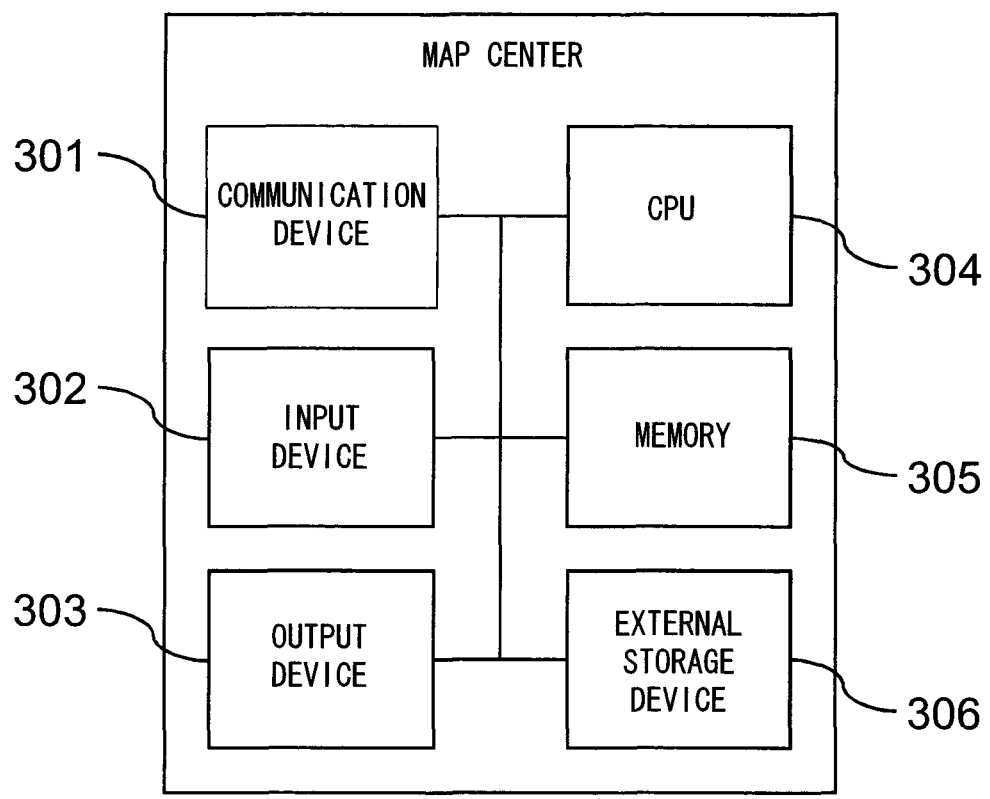
FIG. 3 shows the structure assumed at the map center.

The onboard apparatus 101 adopts a system configuration achieved by adding a GPS receiver, a vehicle speed pulse receiver and sensors such as a gyro sensor, which are inherent structural features of a navigation apparatus, to the standard computer hardware configuration that includes a CPU 204, a memory 205, an input device 202, an output device 203, a communication device 201 and an external storage device 206, as shown in FIG. 2. The functions of the individual processing units are fulfilled by the CPU 204 as it executes a specific program loaded in the memory 205. The onboard map database 106 is stored in the external storage device 206.

The input unit 103 is constituted with hardware buttons located at the casing of the onboard apparatus, a remote control unit provided as a separate unit independent of the body of the onboard apparatus, a touch panel monitor that also functions as the display unit 107, a microphone through which voice commands are entered and the like. The input unit 103 in FIG. 1 is a hardware unit via which instructions issued by the user to engage a map update function, a navigation function or the like of the onboard apparatus are input, and it corresponds to the input device 202 in FIG. 2. The input accepting unit 104, which is constituted with a computer program and hardware engaged in operation by the computer program, executes processing for interpreting instructions from the user received via the input unit 103 and directing the instructions to specific processing units. It may execute a predetermined type of preprocessing as necessary before directing the instructions to the individual assigned processing units.

The display unit 107, which may be constituted with a liquid crystal monitor exclusively used for display purposes or the output device 203 such as a touch panel also functioning as the input unit 103, is a hardware unit via which visual information including maps, text, graphics, images and video is provided to the user. It may include a built-in speaker through which audio information is output together with the visual information. The display processing unit 108, constituted with a computer program and hardware engaged in operation by the computer program, executes processing for generating information to be output via the display unit 107 and the like. The navigation processing unit 110 is constituted with a computer program that fulfills navigation functions, including a route search function, a route guidance function and a facility search function, and hardware units engaged in operation by the computer program. The hardware units constituting the navigation processing unit 110 include the GPS receiver, the vehicle speed pulse receiver and sensors such as a gyro sensor.

The onboard map database 106 is a DB (database) where digital map data used by the navigation processing unit 110 and the like are held. The onboard map database 106 is achieved by storing a DB management program and map data assuming a specific data structure into a storage device such as a hard disk. The DB management program is often referred to as a DBMS (database management system). The map data structure includes a road link table, a guidance information table, a POI facility table and the like. In the road link table, the guidance information table, the POI facility table and the like, map data used to fulfill various navigation functions such as route search, map display, route guidance and destination search are recorded. These tables adopt structures similar to the column structure of the various difference update object tables to be described in detail later.

In response to a map update instruction from the user, provided via the input unit 103 and the input accepting unit 104, the map data acquisition unit 109 transmits an update data verification request and an update data transmission request, which are to be described in detail later, to the map center 102 through the communication unit 120. It then receives an update data summary and an update data body transmitted from the map center 102 through the communication network 120 in response. In addition, the map data acquisition unit 109 transfers the data having been obtained from the map center 102 to the display processing unit 108 and the map update processing unit 105. The update data originating from the map center 102 and received at the map data acquisition unit 109 include the update data summary and the update data body. The update data summary is summary information summarizing the base and related atomic map updaters corresponding to the update data verification request issued from the onboard apparatus 101. The update data body is the actual update data to be used in the difference update, and is constituted with at least on base atomic map updater or an aggregate of a base atomic map updater and related atomic map updaters corresponding to the update data transmission request issued from the onboard apparatus 101. The update data summary and the update data body are to be described in further detail later.

The map update processing unit 105 reflects the update data having originated from the map center 102 and having been obtained via the map data acquisition unit 109 in the data in the onboard map database 106, thereby updating the onboard map database 106 to the latest version.

The structure of the map center 102 is now described. In response to the update data verification request and the update data transmission request received from the onboard apparatus 101 via the communication network 120, the map center 102 transmits map update data to the onboard apparatus 101 via the communication network 120.

The map center 102 comprises with map databases each corresponding to a specific map version, e.g., a Ver1 master map database 117, a Ver2 master map database 118 and a Ver3 master map database 119, as well as a map data delivery unit 111, a base atomic map updater collecting unit 112, an atomic map updater generation unit 113, an atomic map updater database 114, a relation definition database 115 and a related atomic map updater collecting unit 116.

The map center 102 is a computer system assuming a standard computer hardware configuration that includes processing units such as a CPU 304, a memory 305, an input device 302, an output device 303, a communication device 301 and an external storage device 306. At the map center 102, the functions of these processing units are fulfilled as the CPU 304 executes specific programs loaded in the memory 305. The atomic map updater database 114, the relation definition database 115, the Ver1 master map database 117, the Ver2 master map database 118 and the Ver3 master map database 119 are stored in the external storage device 306.

The structure assumed in the map center 102 allows it to hold all the map DB's containing the entire contents of the master map data in all the versions to date, from the first version to the latest version. The embodiment is described by assuming that the latest version of master map data is version 3 (Ver3). Structural elements of the map center 102 include the Ver1 master map database 117, the Ver2 master map database 118 and the Ver3 master map database 119.

The Ver1 master map database 117 is a map DB holding all the contents of the master map data in version 1 (Ver1). Likewise, the Ver2 master map database 118 and the Ver3 master map database 119 are map DB's respectively holding all the contents of the master map data in version 2 and the master map data in version 3. The master map databases are the foundation of the onboard map database 106 mentioned earlier, and the contents of the onboard map database are basically identical to the contents of the master map data in a given version.

A master map database includes a road link table, a guidance information table, a POI facility table and the like. In the road link table, the guidance information table, the POI facility table and the like, map data used to fulfill various navigation functions such as route search, map display, route guidance and destination search are recorded. These tables adopt structures similar to the column structure of the various difference update object tables to be described in detail later, as explained earlier, and for this reason, a redundant explanation is not provided.

The map data also include a POI facility category table 1401. FIG. 14 presents a schematic diagram of contents of data that may be registered in the POI facility category table 1401. In the POI facility category table 1401, a list of POI facility categories is registered. A POI facility category record 1405 includes a facility category ID that enables univocal identification of a specific POI (facility) category registered in a "facility category ID" column 1402, and a category name of the POI registered in a "facility category name" column 1403.

In the atomic map updater database 114, an atomic map updater management table 901, a difference object management table 1001, a road difference object table 1101, a guidance information difference object table 1201 and a POI difference object table 1301 are stored.

Atomic map updater management information is registered in the atomic map updater management table 901. FIG. 9 shows the structure of the atomic map updater management table 901. An atomic map updater management information record 912 includes an atomic map updater ID enabling univocal identification of a corresponding atomic map updater, registered in an "atomic map updater ID" column 902, an atomic map updater Ver (version) indicating the atomic map updater map version, registered in an "atomic map updater Ver" column 903, an atomic map updater affiliate area ID indicating the area ID of the area to which a map object designated as an update target by the particular atomic map updater belongs, registered in an "atomic map updater affiliate area ID" column 904, atomic map updater coordinates indicating the representative position of the atomic map updater, registered in an "atomic map updater coordinates" column 905, atomic map updater text information providing a summary of update contents and the atomic map updater data size for the user in a text format, registered in an "atomic map updater text information" column 906, child difference object IDs enabling identification of difference objects included in the atomic map updater and listed in the order in which they are used, registered in a "child difference object ID" column 907, atomic internal name data constituting the entire data related to the names of the map objects included in the atomic map updater, registered in an "atomic internal name data" column 908, atomic internal link IDs assigned to all the road link objects in the atomic map updater, registered in an "atomic internal link ID" column 909, and atomic internal category IDs indicating the facility category IDs assigned to categories to which all the POI facility objects in the atomic map updaters belong, registered in an "atomic internal category ID" column 910.

The "atomic internal name data" column 908, the "atomic internal link ID" column 909 and the "atomic internal category ID" column 910 are used to identify a specific related atomic map updater.

The text data in the "atomic internal name data" column 908 corresponding to a given atomic update map updater are compared with the text data in the "atomic internal name data" column 908 corresponding to another atomic map updater, and if the name text corresponding to the other atomic map updater is identical to the name text for the given atomic map updater, the other atomic map updater is identified as a related atomic map updater. The relation between the atomic map updaters ascertained by comparing the data in this column is to be referred to as a "name relation".

Each link ID in the "atomic internal link ID" column 909 corresponding to a given atomic map updater is compared with link IDs in the same column corresponding to another atomic map updater, and the other atomic map updater is identified as a related atomic map updater if it is determined to hold a related link ID based upon a road link relation definition separately set forth in advance by using a road link relation table 701 to be described in detail later. The relation between atomic map updaters ascertained by comparing the data in this column as described above is to be referred to as a "road link relation".

Each facility category ID in the "atomic internal category ID" column 910 corresponding to a given atomic map updater is compared with the facility category IDs in the same column corresponding to another atomic map updater, and the other atomic map updater is identified as a related atomic map updater if it is determined to hold a related link ID based upon a facility category ID relation definition separately set forth in advance by using a category relation table 801 to be described in detail later. This relation between atomic map updaters ascertained by comparing the data in this column as described above is to be referred to as a "category relation".

In the difference object management table 1001, management information used to manage difference objects is registered. FIG. 10 shows the structure of the difference object management table 1001. A difference object management information record 1013 includes a difference object ID enabling univocal identification of the corresponding difference object registered in a "difference object ID" column 1002, a parent atomic map updater ID assigned to a parent atomic map updater to which the particular difference object belongs, registered in a "parent atomic map updater ID" column 1003, a difference object Ver indicating the version of the master map data from which the difference object is sourced, registered in a "difference object Ver" column 1004, a target map object ID enabling identification of a map object designated as a target of the update operation executed by using the specific difference object, i.e., identification of a target map object, registered in a "target map object ID" column 1005, a map object operation type indicating insert (INS), update (UPD) or delete (DEL) to be executed to update the target map object, registered in a "map object operation type" column 1006, a map object affiliate table enabling identification of the table in which the record of the map target objects is registered in a "map object affiliate table" column 1007, a map object affiliate area ID enabling identification of the map area to which the target map object belongs, registered in a "map object affiliate area ID" column 1008, difference object internal name data related to any map object name included in the difference object, registered in a "difference object internal name data" column 1009, difference object internal link IDs indicating link IDs assigned to all the road link objects included in the difference object, registered in a "difference object internal link ID" column 1010 and difference object internal category IDs indicating the IDs assigned to the facility categories to which all the POI facility objects in the difference object belong, registered in a "difference object internal category ID" column 1011.

Detailed contents of difference objects used to update road link objects are registered in the road difference object table 1101. FIG. 11 shows the structure of the road difference object table 1101. A difference object detailed contents record 1115 for a difference object used to update a road link object includes a difference object ID registered in a "difference object ID" column 1102, a difference object Ver indicating the version of the master map data from which the particular difference object is sourced, registered in a "difference object Ver" column 1103, a map object operation type indicating a specific type of update operation to be executed to update the road link object with the difference object, registered in a "map object operation type" column 1104, a road link ID enabling identification of the operation target road link object, registered in a "road link ID" column 1105, a road link affiliate area ID enabling identification of the area to which the operation target road link object belongs, registered in a "road link affiliate area ID" column 1106, a road type as which the operation target road link object is categorized, registered in a "road type" column 1107, a road name corresponding to the operation target road link object, registered in a "road name" column 1108, a start point node ID enabling identification of the start point node of the operation target road link object, registered in a "start point node ID" column 1109, a start point node-side adjacent link ID enabling identification of another road link object that is adjacent to the operation target road link object on its start point node side, registered in a "start point node-side adjacent link ID" column 1110, an end point node ID enabling identification of the end point node of the operation target road link object, registered in an "end point node ID" column 1111, an end point node-side adjacent link ID enabling identification of another road link object that is adjacent to the operation target road link object on its end point node side, registered in an "end point node-side adjacent link ID" column 1112, and the link length of the operation target road link object, registered in a "link length" column 1113.

The column structure assumed in the road link tables (not shown) in which road link object records are stored in the onboard map database 106 and the individual master map databases 117-119 matches the column structure assumed over a column range 1150 enclosed with the bold line in the road difference object table 1101.

Values are set in all the columns in the column range 1150 enclosed with the bold line in the road difference object table 1101 in correspondence to each record indicating "INS" in the "map object operation type" column 1104. For each record indicating "UPD" in the "map object operation type" column 1104, values are set only in the "road link ID" column 1105, the "road link affiliate area ID" column 1106 and any other column in which the value changes as a result of the difference update, with predefined data ("-" in FIG. 11) indicating that no meaningful data exist set in the remaining columns. For each record indicating "DEL" in the "map object operation type" column 1104, values are set only in the "road link ID" column 1105 and the "road link affiliate area ID" column 1106, with predefined data ("-" in FIG. 11) indicating that no meaningful data exist set in the remaining columns.

In the guidance information difference object table 1201, detailed contents of difference objects to be used to update guidance information objects are registered. FIG. 12 shows the structure of the guidance information difference object table 1201. A difference object detailed contents record 1215 for a difference object used to update a guide information object includes a difference object ID assigned to the particular difference object, registered in a "difference object ID" column 1202, a difference object Ver indicating the version of the master map data from which the difference object is sourced, registered in a "difference object Ver" column 1203, a map object operation type indicating the type of update operation to be executed by using the difference object, registered in a "map object operation type" column 1204, a guide information ID that enables, on its own, identification of the operation target guidance information object, registered in a "guidance information ID" column 1205, a guidance information affiliate area ID enabling identification of the area to which the operation target guidance information object belongs, registered in a "guidance information affiliate area ID" column 1206, an access link ID indicating an access link related to the operation target guidance information object, registered in an "access link ID" column 1207, a guidance point node ID enabling identification of a guidance point related to the operation target guidance information object, registered in a "guidance point node ID" column 1208, an exit link ID assigned to an exit link related to the operation target guidance information object, registered in an "exit link ID" column 1209, a road signpost image file name related to the operation target guidance information object, registered in a "road signpost image file name" column 1210, road signpost text related to the operation target guidance information object, registered in a "road signpost text" column 1211, a guidance audio file name related to the operation target guidance information object, registered in a "guidance audio file name" column 1212, and a guidance audio keyword related to the operation target guidance information object, registered in a "guidance audio keyword" column 1213.

The column structure assumed in a column range 1250 enclosed with the bold line in the guidance information difference object table 1201 matches the column structure of the guidance information tables (not shown) in which guidance information object records are stored in the onboard map database 106 and the individual master map databases 117~119.

Values are set in all the columns in the column range 1250 enclosed with the bold line in the guidance information difference object table 1201 in correspondence to each record indicating "INS" in the "map object operation type" column 1204. For each record indicating "UPD" in the "map object operation type" column 1204, values are set only in the "guidance information ID" column 1205, the "guidance information affiliate area ID" column 1206 and any other column in which the value changes as a result of the difference update, with predefined data ("-" in FIG. 12) indicating that no meaningful data exist set in the remaining columns. For each record indicating "DEL" in the "map object operation type" column 1204, values are set only in the "guidance information ID" column 1205 and the "guidance information affiliate area ID" column 1206, with predefined data ("-" in FIG. 12) indicating that no meaningful data exist set in the remaining columns.

In the POI difference object table 1301, detailed contents of difference objects to be used to update POI facility objects are registered. FIG. 13 shows the structure of the POI difference object table 1301. A difference object detailed contents record 1311 for a difference object used to update a POI facility object includes a difference object ID assigned to the particular difference object, registered in a "difference object ID" column 1302, a difference object Ver indicating the version of the master map data from which the difference object is sourced, registered in a "difference object Ver" column 1303, a map object operation type indicating the type of update operation to be executed by using the difference object, registered in a "map object operation type" column 1304, a POI facility ID that enables identification of the operation target POI facility object, registered in a "POI facility ID" column 1305, a facility name of the operation target POI facility object, registered in a "facility name" column 1306, a POI facility category ID indicating the facility category ID to which the operation target POI facility object belongs, registered in a "facility category ID" column 1307, a POI facility affiliate area ID enabling identification of the area to which the operation target POI facility object belongs, registered in a "facility affiliate area ID" column 1308, and facility coordinates provided as coordinate information indicating the representative position of the operation target POI facility object, registered in a "facility coordinates" column 1309.

The column structure assumed in a column range 1350 enclosed with the bold line in the POI facility table 1301 matches the column structure of the POI facility tables (not shown) in which POI object records are stored in the onboard map database 106 and the individual master map databases 117~119.

Values are set in all the columns in the column range 1350 enclosed with the bold line in the POI difference object table 1301 in correspondence to each record indicating "INS" in the "map object operation type" column 1304. For each record indicating "UPD" in the "map object operation type" column 1304, values are set only in the "POI facility ID" column 1305, the "facility affiliate area ID" column 1308 and any other column in which the value changes as a result of the difference update, with predefined data ("-" in FIG. 13) indicating that no meaningful data exist set in the remaining columns. For each record indicating "DEL" in the "map object operation type" column 1304, values are set only in the "POI facility ID" column 1305 and the "facility affiliate area ID" column 1308, with predefined data ("-" in FIG. 13) indicating that no meaningful data exist set in the remaining columns.

The description of the map center 102 is resumed in reference to FIG. 1. The atomic map updater generation unit 113, the function of which is fulfilled in the form of a computer program executed by the CPU 304, executes atomic map updater generation processing. An atomic map updater is difference update data with which map data can be updated while sustaining consistency among map objects that have a direct referential relationship. Accordingly, referential relationships that may exist among map objects are investigated and update operations for individual map objects are bundled in correspondence to groups each made up with map objects connected in a referential relationship in the atomic map updater generation processing.

The map data delivery unit 111 is constituted with a computer program executed by the CPU 304 and a communication device 301. The map data delivery unit 111, having received the update data verification request or the update data transmission request from the onboard apparatus 101 via the communication network 120, transmits the requested update data summary or update data body to the onboard apparatus 101 through the communication network 120 as soon as the update data summary or the update data body corresponding to the request issued by the onboard apparatus 101 is ready for transmission.

The base atomic map updater collecting unit 112, the function of which is fulfilled by a computer program executed by the CPU 304, searches for an atomic map updater needed to update the data in a map block selected by the user as a map update target, indicated in the request transmitted from the onboard apparatus 101, and extracts the atomic map updater ascertained through the search as a base atomic map updater from the atomic map updater database 114, in response to the request from the onboard apparatus 101 having been received at the map data delivery unit 111.

The related atomic map updater collecting unit 116 is constituted with a computer program and hardware engaged in operation by the computer program. The related atomic map updater collecting unit 116, called up by the map data delivery unit 111, searches for another atomic map updater, related to the base atomic map updater having been collected by the base atomic map updater collecting unit 112, and extracts the other atomic map updater ascertained through the search as a related atomic map updater from the atomic map updater database 114. Relation information used to identify related atomic map updater's is stored in advance in the relation definition database 115.

When extracting either a base atomic map updater or a related atomic map updater, an update data summary to be handed over to the map data delivery unit 111 can be generated simply by extracting part of the information in the atomic map updater and an update data body to be handed over to the map data delivery unit 111 can be generated by extracting the entire information in the atomic map updater. The update data summary and the update data body are to be described in detail later.

The relation definition database 115 includes an atomic map updater relation table 601, used as an index table based upon which the related atomic map updater ID of a related atomic map updater corresponding to a given base atomic map updater can be ascertained based upon the base atomic map updater ID, and a road link relation table 701 and a category relation table 801 in which definition information needed when generating contents of the atomic map updater relation table 601 is registered.

FIG. 6 shows the structure of the atomic map updater relation table 601. In the atomic map updater relation table 601, information that allows the related atomic map updater ID, assigned to each atomic map updater related to a base atomic map updater and the type of relation to the base atomic map updater to be determined based upon the base atomic map updater ID is registered. An atomic map updater relation record 606 includes the base atomic map updater ID of the corresponding base atomic map updater, registered in a "base atomic map updater ID" column 602, the related atomic map updater ID of the related atomic map updater, registered in a "related atomic map updater ID" column 603, and a relation type indicating the specific nature of the semantic relation between the atomic map updaters, registered in a "relation type" column 604. In the embodiment, one of three relation types is entered in the "relation type" column 604. The first relation type is a "name relation". When two atomic map updaters have identical name text, the two atomic map updaters are judged to have a name relation to each other. The second relation type is a "road link relation". When two atomic map updaters include road links defined as related roads in advance in the road link relation table 701, the two atomic map updaters are judged to be in a road link relation to each other. The third relation type is a "category relation". When two atomic map updaters both include facility categories defined in advance as related facility categories in the category relation table 801, the two atomic map updaters are judged to be in a category relation to each other.

In the road link relation table 701, information that allows a related link ID, assigned to each related link, to be determined based upon a base link ID assigned to a relation prompting link, i.e., the base link, is registered. FIG. 7 shows the structure of the road link relation table 701. Each record 705 in the road link relation table includes the base link ID, registered in a "base link ID" column 702, and the related link ID registered in a "related link ID" column 703.

A relationship existing between the base link and the related link according to the present invention may be, for instance, the relationship between a road link representing the road that is used under normal circumstances and a road link representing a road used as bypass. It is desirable to be able to determine, when updating the base link, whether or not update information corresponding to the related link is also available and whether or not the related link should also be updated provided that the update information for the related link is available. The information that allows the related link ID to be determined based upon the base link ID is registered in the road link relation table 701. This information may be manually registered by personnel or the information may be registered by the CPU 304 in the map center 102 by collecting information indicating the traveling history of each subject vehicle executing statistical processing based upon the history of passages through the road links in different traveling routes connecting two geographical points, extracting the relationship existing between a road link representing the road that is used under normal circumstances and a road link representing a road used as bypass and registering the extraction results.

In the category relation table 801, information that allows the facility category of each related POI, i.e., a related facility category, to be identified based upon the facility category of a relation prompting POI, i.e., based upon the base facility category, is registered. FIG. 8 shows the structure of the category relation table 801. Each record 804 in the category relation table includes the facility category ID assigned to the base facility category, registered in a "base facility category" column 802, and the facility category ID assigned to the related facility category, registered in a "related facility category" column 803.

A relationship existing between the base facility category and the related facility category according to the present invention may be the relationship between POI facility categories of POI facilities that can be expected to be alternately or successively utilized by the user based upon a general user behavioral pattern. It is desirable to be able to determine, when updating the POI belonging to the base facility category, whether or not update information is also available for the POI belonging to the related facility category and whether or not the POI belonging to the related facility category should also be updated provided that the update information for the POI belonging to the related facility category is available. The information that allows the related facility category ID to be identified based upon the base facility category ID is registered in the category relation table 801. For instance, since a user going on a trip is likely to use a POI belonging to an "accommodation" category and is also likely to use a POI in a "leisure facility" category, the "leisure facility" category is set in relation to the "accommodation" category. This relation may be manually registered by personnel or it may be registered by the CPU 304 in the map center 102 by collecting a POI search history and a POI selection history indicating specific POIs selected as destinations and the like, executing statistical processing relating to the order with which individual facility categories are specified, extracting a specific relationship between facility categories that are selected alternatively or consecutively and registering the extraction results.

The onboard apparatus 101 and the map center 102 are connected with each other via the communication network 120. The communication network 120 is constituted with a communication medium via which digital data are exchanged, such as the Internet, a telephone network or the like. A wireless communication network (not shown) is present between the onboard apparatus 101 and the communication network 120, and the onboard apparatus 101 installed in an automobile is able to communicate with the map center 102 as long as it is within wireless communication range.

Figure 15:
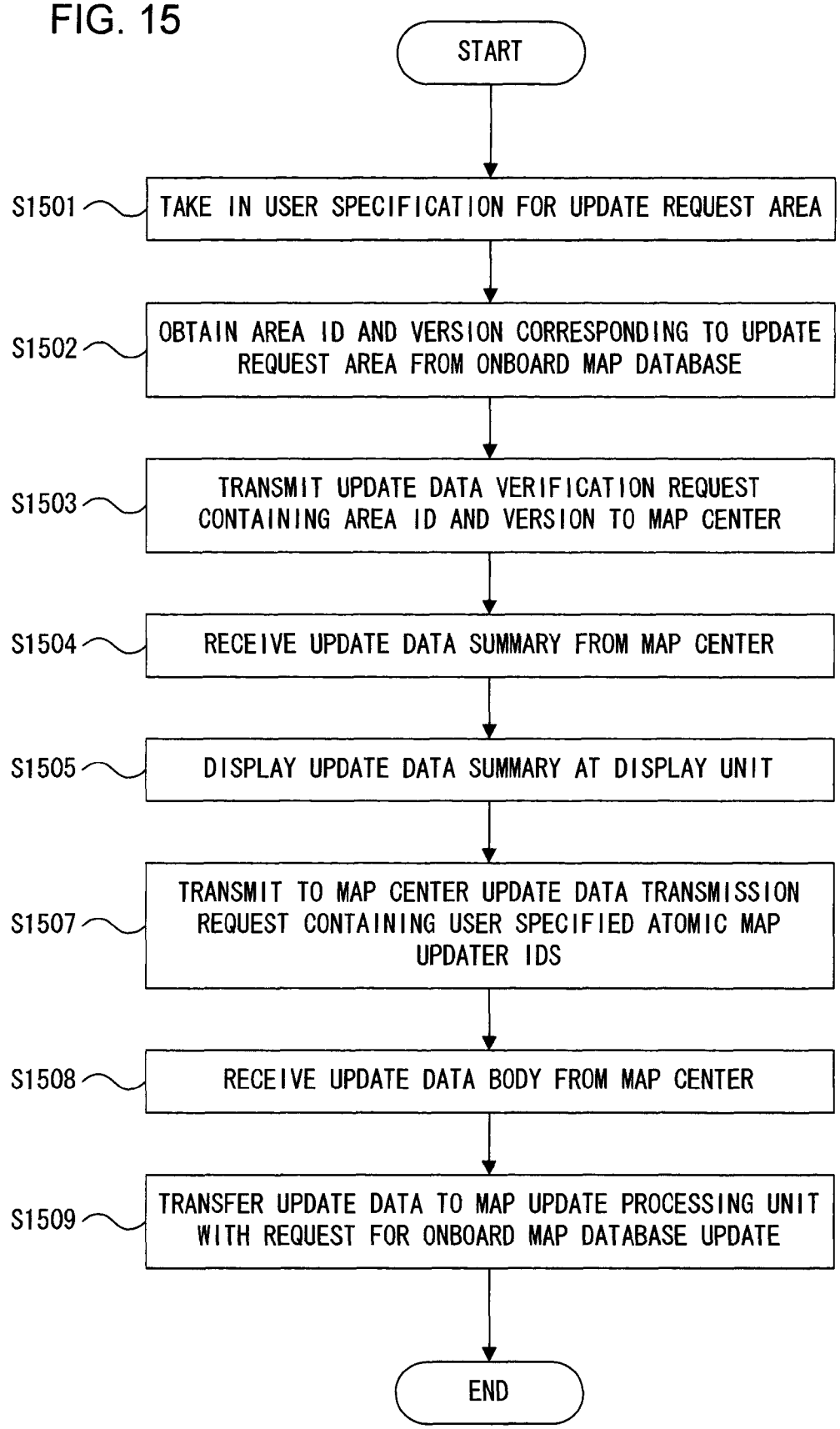
FIG. 15 presents a flowchart of the map data update processing executed in the onboard apparatus.

The flow of the processing executed in the onboard apparatus 101 is described. FIG. 15 presents a flowchart of the processing executed in the map data acquisition unit 109 of the onboard apparatus 101 in a map update data delivery system adopting the present invention. In response to a map update instruction issued by the user, the map data acquisition unit 109 transmits an update data verification request and an update data transmission request to the map center 102 via the communication network 120, and receives an update data summary and update data (update data body) provided by the map center 102 in response. The data obtained from the map center 102 are transferred to the display processing unit 108 and the map update processing unit 105.

The following is a detailed description of this processing flow. The map data acquisition unit 109 accepts a user specification indicating an area to be designated as an update target (update request area) via the input unit 103 and the input accepting unit 104 (step S1501). It then obtains, from the onboard map database 106, information indicating the area ID assigned to the update request area and the version of the map data for the particular area currently held in the onboard map database 106 (step S1502). Since the map can be updated in units of individual map blocks, the versions of the map data for various blocks may not match. In order to verify whether or not update data that can be used to update the onboard map data corresponding to the update request area are available in the map center 102, an update data verification request indicating the area ID of the update request area and the map data version is transmitted to the map center 102 via the communication network 120 (step S1503).

The map data acquisition unit 109 receives, via the communication network 120, a notice sent by the map center 102 in a first transmission, providing a summary of applicable update data or indicating that the current onboard map data for the update request area are of the latest version and thus there are no applicable update data (step S1504).

In this situation, the data identified as the applicable update data at the map center 102 in response to the update data verification request include base atomic map updaters used to completely update the onboard map data in the update request area and also any related atomic map updater that is extracted to update map data that do not have a direct referential relation to the map data designated as the update target in correspondence to a base atomic map updater, but are semantically related to the map data designated as the update target in correspondence to the base atomic map updater. If no related atomic map updater is extracted, the update data will be constituted exclusively with the base atomic map updaters.

The map data acquisition unit 109 provides the received update data summary to the user by bringing it up on display via the display processing unit 108 and the display unit 107 (step S1505).

The map data acquisition unit 109 then accepts a selection of update data (atomic map updater) to be incorporated into the onboard map database 106, made by the user in the update data summary screen brought up on display, via the input unit 103 and the input accepting unit 104, and transmits an update data transmission request that includes the ID assigned to the update data (atomic map updater) selected by the user to the map center 102 via the communication network 120 (step S1507).

The map data acquisition unit 109 receives the update data body sent by the map center 102 in a second transmission (step S1508). The map data acquisition unit 109 transfers the map update data body having been received to the map update processing unit 105 and requests that the update data body be used to update the onboard map database 106 (step S1509).

Figure 16:
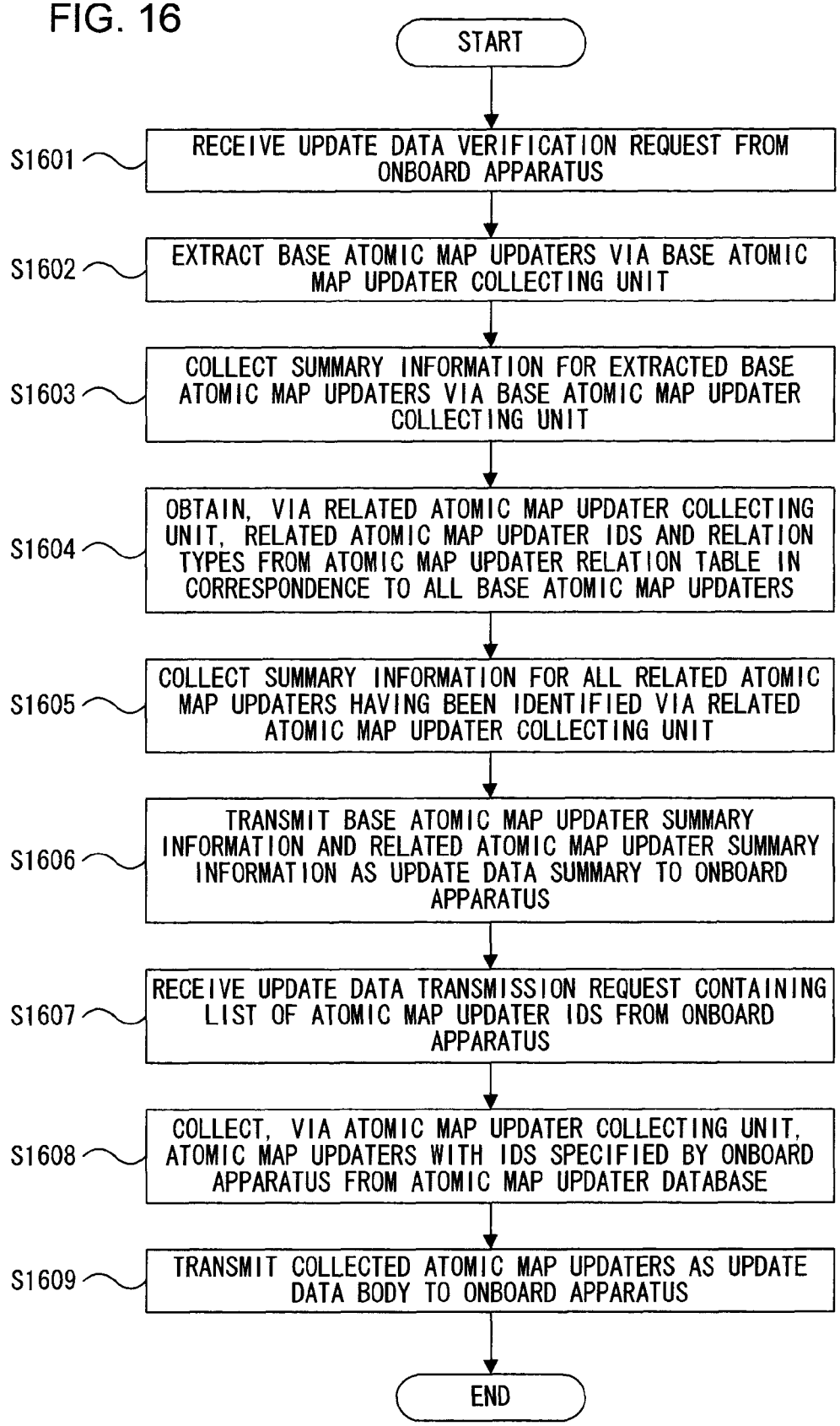
FIG. 16 presents a flowchart of the map update dated delivery processing executed in the map center.

The flow of the processing executed in the map center 102 is now described. FIG. 16 presents a flowchart of the processing executed in the map data delivery unit 111 at the map center 102 in the map update data delivery system adopting the present invention. The map data delivery unit 111 receives the update data verification request and the update data transmission request from the onboard apparatus 101 via the communication network 120. As the update data summary and the update data body corresponding to the requests from the onboard apparatus 101 become ready for transmission, it transmits the update data summary and the update data body to the onboard apparatus 101 via the communication network 120.

The following is a detailed description of this processing flow. The map data delivery unit 111 receives the update data verification request from the onboard apparatus 101 (step S1601).

The map data delivery unit 111 extracts the area ID of the update request area and the map data version of the map data for the particular area currently held in the onboard map database from the update data verification request received from the onboard apparatus 101. It then transfers the information indicating the area ID and the map data version to the base atomic map updater collecting unit 112 with a request to the base atomic map updater collecting unit 112 for a base atomic map updater extraction. The base atomic map updater collecting unit 112 searches through the atomic map updater management table 901 in the atomic map updater database 114 and extracts all the atomic map updaters with area IDs indicated in the "atomic map updater affiliate area ID" column 904 matching the area ID specified by the onboard apparatus, which also assume values, indicated in the "atomic map updater Ver" column 903, greater than the map data version indicated by the onboard apparatus. The atomic map updaters thus extracted are designated as base atomic map updaters (step S1602).

The map data delivery unit 111 issues a request for the base atomic map updater collecting unit 112 that summary information for the extracted base atomic map updaters be collected. The base atomic map updater collecting unit 112 obtains the values indicated in the "atomic map updater ID" column, the "atomic map updater affiliate area ID" column, the "atomic map updater coordinate" column and the "atomic map updater text information" column in the atomic map updater management table 901 in correspondence to all the base atomic map updaters having been extracted. The map data delivery unit 111 then collects the column values having been obtained by the base atomic map updater collecting unit 112 as the summary information for the base atomic map updaters (step S1603).

The map data delivery unit 111 issues a request for the related atomic map updater collecting unit 116 that related atomic map updaters be identified. The related atomic map updater collecting unit 116 obtains related atomic map updater IDs and relation types from the atomic map updater relation table 601 by using the IDs of all the base atomic map updaters having been identified in step S1602 as search keys. The map data delivery unit 111 obtains the atomic map updaters corresponding to the related atomic map updater IDs having been obtained by the related atomic map updater collecting unit 116 as related atomic map updaters and also obtains the relation types corresponding to the related atomic map updaters (step S1604).

The map data delivery unit 111 issues a request for the related atomic map updater collecting unit 116 that summary information for the related atomic map updaters be collected. The related atomic map updater collecting unit 116 obtains the values indicated in the "atomic map updater ID" column, the "atomic map updater affiliate area ID" column, the "atomic map updater coordinate" column and the "atomic map updater text information" column in the atomic map updater management table 901 in correspondence to all the related atomic map updaters having been identified in step S1604. The map data delivery unit 111 then collects the column values having been obtained by the related atomic map updater collecting unit 116 as the summary information for the base atomic map updaters (step S1605).

The map data delivery unit 111 transmits an update data summary compiled by combining the base atomic map updater summary information and the related atomic map updater summary information respectively having been obtained in step S1603 and in step S1605, to the onboard apparatus 101. Each set of summary information transmitted at this time includes information indicating whether the particular summary information summarizes a base atomic map updater or a related atomic map updater. For instance, each set of summary information being transmitted (through the first transmission) may include a 1-bit base/related identifier flag which assumes a value of "0" if the summary information summarizes a base atomic map updater and assumes a value of "1" if the summary information summarizes a related atomic map updater (step S1606).

The map data delivery unit 111 then waits for the map data transmission request from the onboard apparatus 101, which will include a list of atomic map updater IDs belonging to the atomic map updaters having been selected by the user as target atomic map updaters for the update data body transmission. In this situation, the processing flow ends unless the map data delivery unit 111 receives the update data transmission request from the onboard apparatus 101 before a predetermined length of time elapses, whereas the operation proceeds to the next step S1608 in the processing flow if the update data transmission request is received before the predetermined length of time elapses (step S1607).

The map data delivery unit 111 extracts the list of atomic map updater IDs, indicating the atomic map updaters having been selected by the user as targets for the update data body transmission request, from the update data transmission request having been received from the onboard apparatus 101 in step S1607. It then passes the list over to the base atomic map updater collecting unit 112 and the related atomic map updater collecting unit 116 and have the base atomic map updater collecting unit 112 and the related atomic map updater collecting unit 116 obtain the base map updaters and the related map updaters requested by the user from the atomic map updater database 114. The map data delivery unit 111 then collects the atomic map updaters having been obtained by the base atomic map updater collecting unit 112 and the related atomic map updater collecting unit 116 as an update data body, i.e., the substance of the update data themselves (step S1608). As explained earlier, if no related atomic map updaters are extracted, the update data will be constituted exclusively with base atomic map updaters.

The map data delivery unit 111 transmits the update data body having been collected in step S1608 to the onboard apparatus 101 through the communication network 120 (second transmission). At this time, the update data body is transmitted by appending 1-bit information constituting a base/related identifier flag to each of the atomic map updaters constituting the update data body so as to indicate whether the particular atomic map updater has been identified as a base atomic map updater or a related atomic map updater (step S1609), in much the same way as that with which the summary information is transmitted. The base/related identifier flag is set to "0" if the atomic map updater is a base atomic map updater and is set to "1" if it is a related atomic map updater.

The map data delivery unit 111 subsequently enters a standby state to wait for an update data verification request from the onboard apparatus 101.

Figure 17:
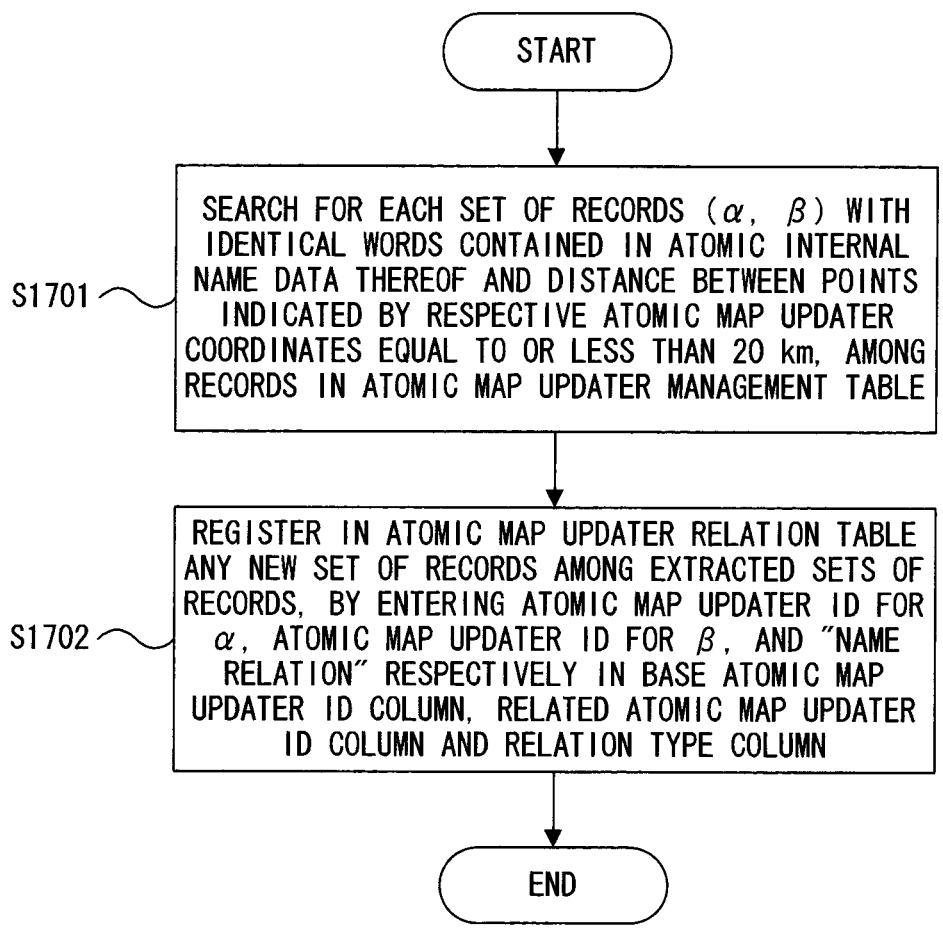
FIG. 17 presents a flowchart of the processing executed to generate a record, the type of relation of which is a name relation, to be registered in the atomic map updater relation table.

The flow of "name relation" record generation executed to generate a record in correspondence to which "name relation" will be indicated in the atomic map updater relation table 601, is now described. FIG. 17 presents a flowchart of the processing executed in the atomic map updater generation unit 113 at the map center 102 in the map update data delivery system in the embodiment when generating a new data record in correspondence to which "name relation" will be indicated in the "relation type" column 604 of the atomic map updater relation table 601 and registering the newly generated data record. This processing is executed when a new version of master map data is released and generation of new atomic map updaters is completed.

The atomic map updater generation unit 113 searches for each set of records (α, β) among the records in the atomic map updater management table 901, with identical words entered in the "atomic internal name data" column 908 and corresponding to two atomic map updaters set apart from each other by a distance, determined based upon the values indicated in the "atomic map updater coordinate" column 905, equal to or less than 20 km. While there is a general tendency that two atomic map updaters with identical words indicated in the "atomic internal name data" column 908 are highly likely to be related to the same geographical location or object or related to similar geographical locations or objects and are thus likely to be semantically related, there is also a general tendency that two atomic map updaters physically close to each other are more likely to be semantically related to each other. Accordingly, the atomic map updater generation unit 113 takes these general tendencies into consideration and extracts each pair of atomic map updaters with identical words indicated in the "atomic internal name data" column which are also set apart from each other by a distance equal to or less than a predetermined value. While each pair of atomic map updaters set apart by 20 km or less is extracted in the example described above, it is desirable to fine-tune the predetermined value used as the threshold for the atomic map updater distance (step S1701).

The atomic map updater generation unit 113 runs a check for each set of records (α, β) having been extracted in step S1701 to ensure that the atomic map updater relation table 601 does not yet have a record indicating the atomic map updater ID corresponding to the record α, the atomic map updater ID corresponding to the record β and "name relation" entered in the "base atomic map updater ID" column, the "related atomic map updater ID" column and the "relation type" column and registers each record, confirmed to be new based upon the check results (step S1702).

Figure 18:
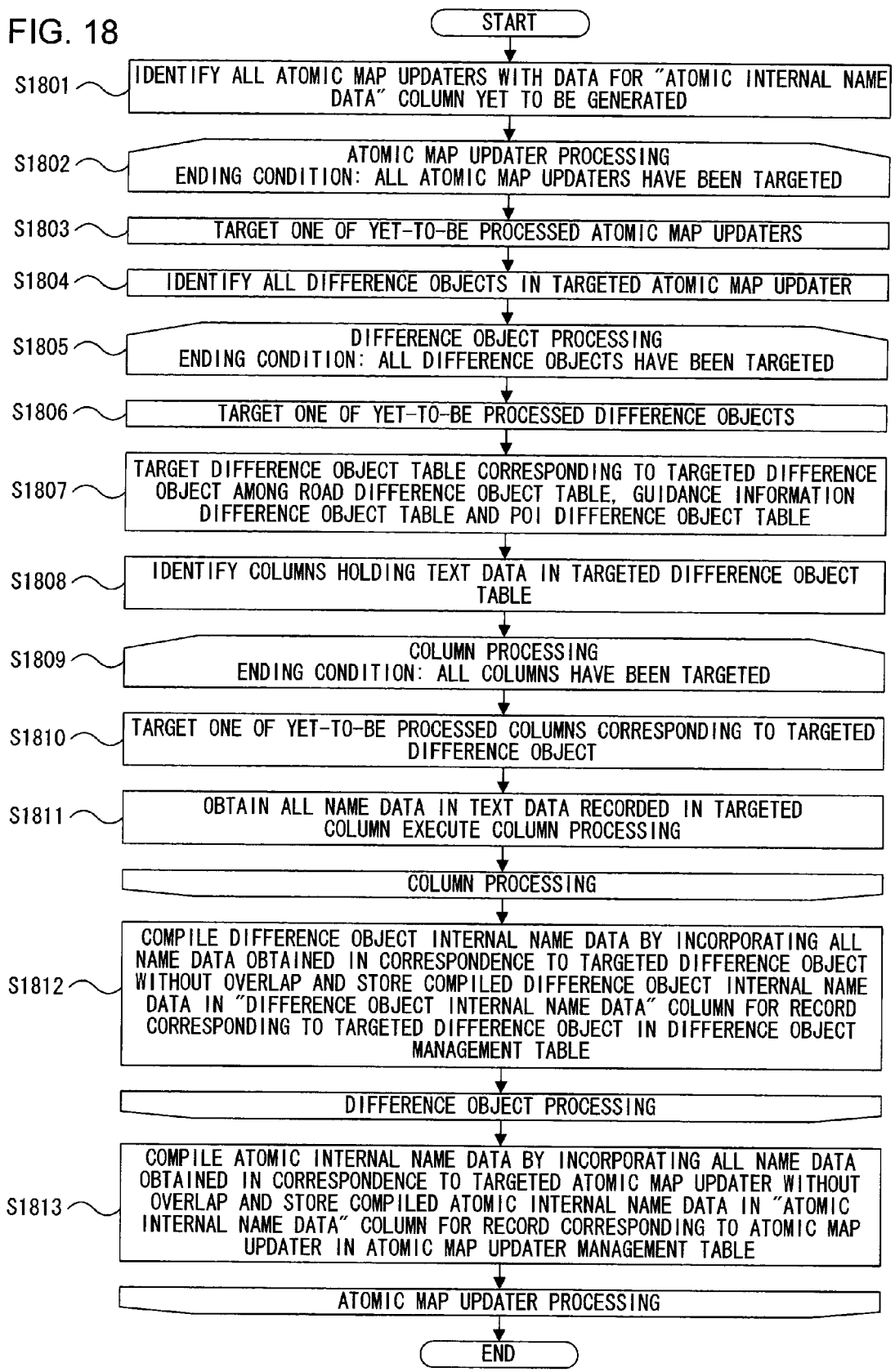
FIG. 18 presents a flowchart of the processing executed to generate data to be stored as atomic internal name data in the atomic map updater management table.

The atomic internal name data generation flow is now described. FIG. 18 presents a flowchart of the processing executed in the atomic map updater generation unit 113 at the map center 102 in the map update data delivery system in the embodiment when generating data to be stored in the "difference object internal name data" column 1008 in the difference object management table 1001 and the "atomic internal name data" column 908 in the atomic map updater management table 901 and updating the contents of these columns with the newly generated data. This processing is executed when a new version of master map data is released and generation of atomic map updaters corresponding to the new version is completed.

The atomic map updater generation unit 113 references the atomic map updater management table 901 and identifies all the atomic map updaters in correspondence to which no value has been entered in the "atomic internal name data" column 908 (step S1801).

The atomic map updater generation unit 113 executes an atomic map updater processing loop until all the atomic map updaters having been identified in step S1801 are processed (step S1802). In the atomic map updater processing loop, one of the yet-to-be processed atomic map updaters is targeted (step S1803) and all the difference objects in the targeted atomic map updater are identified (step S1804).

Until all the difference objects having been identified are processed, the atomic map updater generation unit 113 keeps executing a difference object processing loop (step S1805). In the difference object processing loop, one of the yet-to-be processed difference objects is targeted (step S1806). Among the three difference object tables, i.e., the road difference object table 1101, the guidance information difference object table 1201 and the POI difference object table 1301, the difference object table corresponding to the targeted difference object is then targeted (step S1807). The columns holding text data in the targeted difference object table are all identified (step S1808).

The atomic map updater generation unit 113 executes a column processing loop until all the identified columns are processed (step S1809). In the column processing loop, one of the yet-to-be processed columns is targeted (step S1810). All the name data included in the text data recorded in the targeted column corresponding to the targeted difference object are then obtained. This may be achieved by, for instance, analyzing the text data in the column and extracting all the nouns in the text data based upon a morphological analysis algorithm of the known art (step S1811).

Upon completing the column processing loop for obtaining all the name data stored in the columns holding character strings in the difference object table corresponding to the targeted difference object, the atomic map updater generation unit 113 incorporates all the name data having been obtained in relation to the currently targeted difference object by handling any overlapping name data as a single set of name data, and stores a name data aggregate thus obtained into the "difference object internal name data" column 1009 for the record corresponding to the currently targeted difference object in the difference object management table 1001 (step S1812).

Upon completing the difference object processing loop for obtaining name data in correspondence to all the difference objects included in the targeted atomic map updater, the atomic map updater generation unit 113 incorporates all the name data having been obtained in correspondence to the currently targeted atomic map updater by handling any overlapping name data as a single set of name data and stores a name data aggregate thus obtained into the "atomic internal name data" column 908 for the record corresponding to the currently targeted atomic map updater in the atomic map updater management table 901 (step S1813).

Once the atomic map updater processing loop for processing all the identified atomic map updaters is completed, this processing flow ends.

Figure 19:
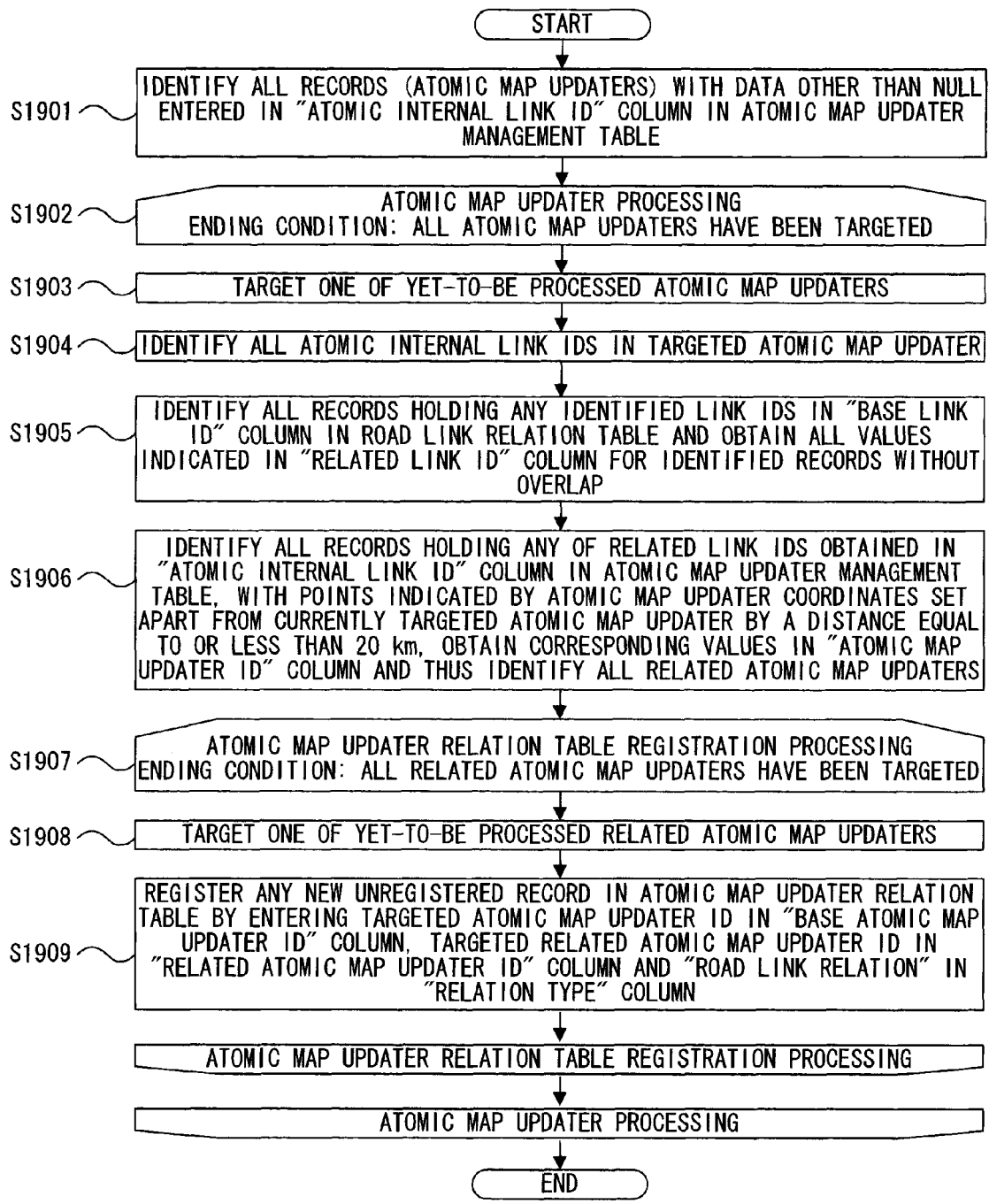
FIG. 19 presents a flowchart of the processing executed to generate a record, the type of relation of which is the road link relation, to be registered in the atomic map updater relation table.

The flow of "road link relation" record generation executed to generate a record in correspondence to which a "road link relation" will be indicated in the atomic map updater relation table 601 is described next. FIG. 19 presents a flowchart of the processing executed by the atomic map updater generation unit 113 at the map center 102 in the map update data delivery system in the embodiment when generating a new data record with "road link relation" entered in the "relation type" column 604, to be newly registered in the atomic map updater relation table 601. This processing is executed when a new version of master map data is released and generation of atomic map updaters that will enable difference update to the new version of the master map data is completed.

The atomic map updater generation unit 113 identifies all the records for atomic map updaters in correspondence to which data other than "NULL" are entered in the "atomic internal link ID" column 909 in the atomic map updater management table 901 (step S1901).

The atomic map updater generation unit 113 executes an atomic map updater processing loop until all the atomic map updaters having been identified in step S1901 are processed (step S1902). In the atomic map updater processing loop, the atomic map updater generation unit 113 targets one of the yet-to-be processed atomic map updaters among the atomic map updaters having been identified in step S1901 (step S1903). It then identifies all link IDs included in the "atomic internal link ID" column in correspondence to the targeted atomic map updater (step S1904). In the road link relation table 701, each record with the link ID entered in the "base link ID" column 702 thereof, matching any link ID among the link IDs having been identified in step S1904 is identified, and the related link IDs entered in all the records thus identified are obtained. At this time, any overlapping related link IDs are incorporated as a single related link ID (step S1905).

The atomic map updater generation unit 113 identifies each atomic map updater in the atomic map updater management table 901 with any of the related link IDs having been obtained in step S1905 entered in the "atomic internal link ID" column 909, which is also set apart from the currently targeted atomic map updater by a distance equal to or less than 20 km, and obtains the atomic map updater IDs of all the atomic map updaters thus identified. At this time, a single atomic map updater ID is obtained in correspondence to any overlapping atomic map updater IDs. As a result, all the related atomic map updaters in "road link relation" to the currently targeted atomic map updater designated as the base atomic map updater are identified (step S1906).

The atomic map updater generation unit 113 executes the atomic map updater relation table registration processing loop until all the related atomic map updaters having been obtained in step S1906 are processed (step S1907). In the atomic map updater relation table registration processing loop, a yet-to-be processed related atomic map updater among the related atomic map updaters having been obtained in step S1906 is targeted (step S1908). A record with the ID of the base atomic map updater having been targeted in step S1903 entered in the "base atomic map updater ID" column, with the ID of the related atomic map updater having been targeted in step S1908 entered in the "related atomic map updater ID" column and with the value corresponding to "road link relation" entered in the "relation type" column is additionally registered in the atomic map updater relation table 601 by first ensuring that no identical record is already registered (step S1909).

Figure 20:
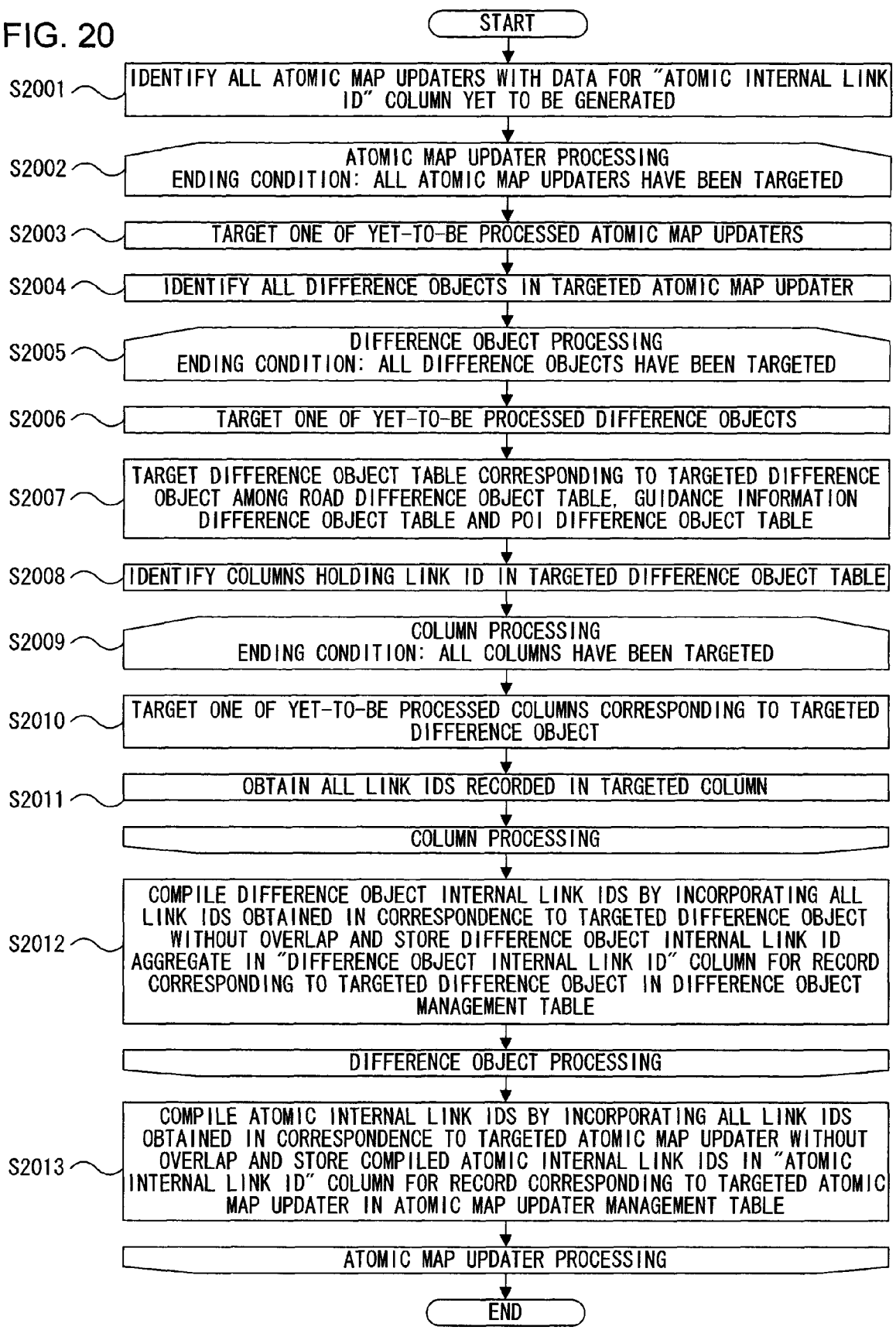
FIG. 20 presents a flowchart of the processing executed to generate data to be stored as atomic internal link ID data in the atomic map updater management table.

An atomic internal link ID generation flow is now described. FIG. 20 presents a flowchart of the processing executed in the atomic map updater generation unit 113 at the map center 102 in the map update data delivery system in the embodiment when generating data to be stored in the "difference object internal link ID" column 1010 in the difference object management table 1001 and the "atomic internal link ID" column 909 in the atomic map updater management table 901 and updating the contents of these columns with the newly generated data. This processing is executed when a new version of master map data is released and generation of atomic map updaters that will enable difference update to the new version of the master map data is completed.

The atomic map updater generation unit 113 references the atomic map updater management table 901 and identifies all the atomic map updaters in correspondence to which no value has been entered in the "atomic internal link ID" column 909 (step S2001).

The atomic map updater generation unit 113 executes an atomic map updater processing loop until all the atomic map updaters having been identified in step S2001 are processed (step S2002). In the atomic map updater processing loop, one of the yet-to-be processed atomic map updaters is targeted (step S2003) and all the difference objects in the targeted atomic map updater are identified (step S2004).

Until all the difference objects having been identified are processed, the atomic map updater generation unit 113 keeps executing a difference object processing loop (step S2005). In the difference object processing loop, one of the yet-to-be processed difference objects is targeted (step S2006). Among the three difference object tables, i.e., the road difference object table 1101, the guidance information difference object table 1201 and the POI difference object table 1301, the difference object table corresponding to the targeted difference object is then targeted (step S2007). The columns holding link IDs in the targeted difference object table are all identified (step S2008).

The atomic map updater generation unit 113 executes a column processing loop until all the identified columns are processed (step S2009). In the column processing loop, one of the yet-to-be columns is targeted (step S2010). Each link ID recorded in the targeted column is then obtained (step S2011).

Upon completing the column processing loop for obtaining the link IDs in all the columns holding link IDs in the difference object table corresponding to the targeted difference object, the atomic map updater generation unit 113 incorporates all the link IDs having been obtained in relation to the currently targeted difference object by handling any overlapping link IDs as a single link ID, and stores a link ID aggregate thus obtained into the "difference object internal link ID" column 1010 for the record corresponding to the currently targeted difference object in the difference object management table 1001 (step S2012).

Upon completing the difference object processing loop for obtaining all the link IDs in correspondence to all the difference objects included in the targeted atomic map updater, the atomic map updater generation unit 113 incorporates the link IDs having been obtained in correspondence to the currently targeted atomic map updater by handling any overlapping link IDs as a single link ID and stores a link ID aggregate thus obtained into the "atomic internal link ID" column 909 for the record corresponding to the currently targeted atomic map updater in the atomic map updater management table 901 (step S2013).

Once the atomic map updater processing loop for processing all the identified atomic map updaters is completed, this processing flow ends.

Figure 21:
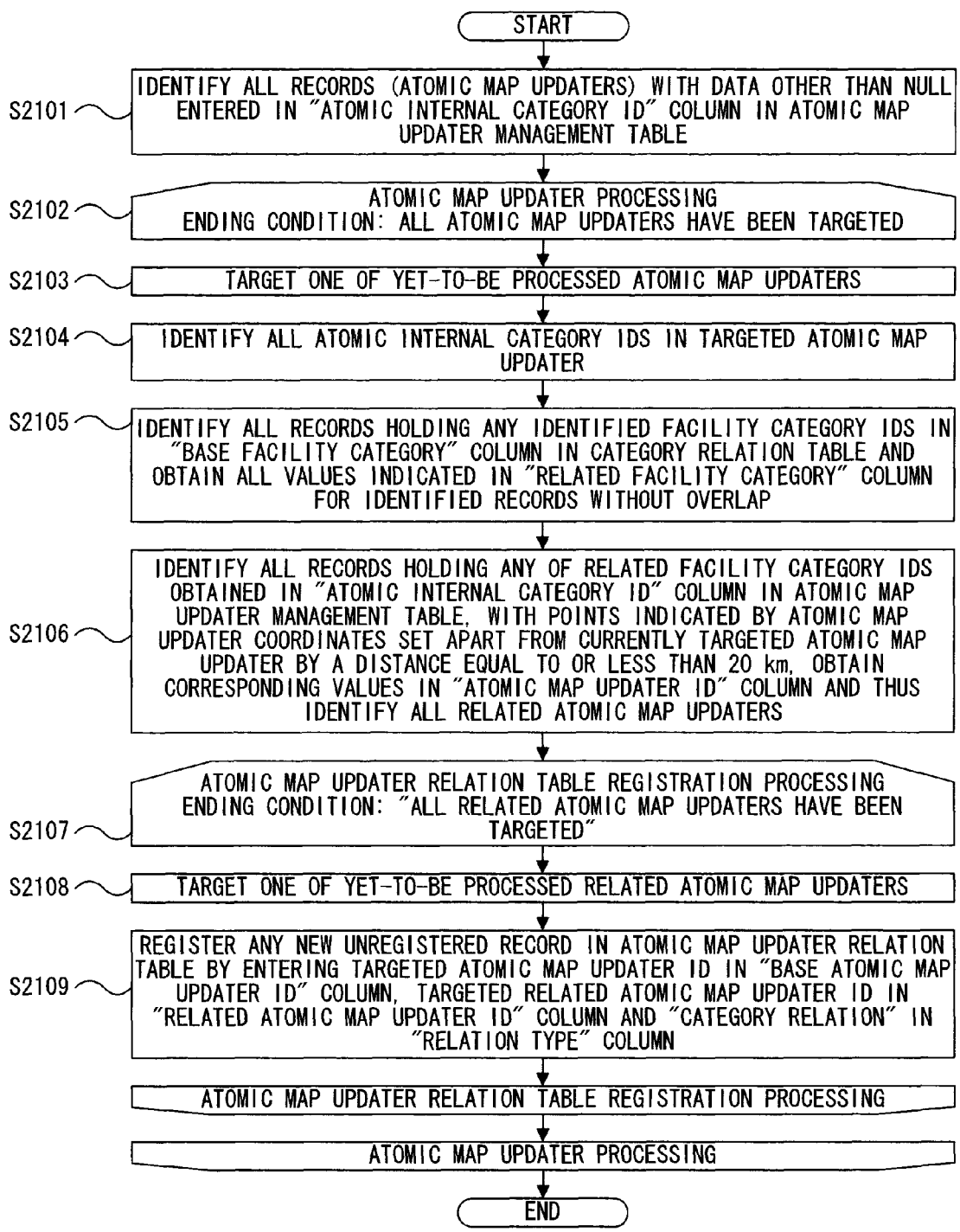
FIG. 21 presents a flowchart of the processing executed to generate a record, the type of relation of which is the category relation, to be registered in the atomic map updater relation table.

The flow of "category relation" record generation executed to generate a record in correspondence to which "category relation" will be indicated in the atomic map updater relation table 601, is described next. FIG. 21 presents a flowchart of the processing executed by the atomic map updater generation unit 113 at the map center 102 in the map update data delivery system in the embodiment when generating a new data record with "category relation" entered in the "relation type" column 604, to be newly registered in the atomic map updater relation table 601. This processing is executed when a new version of master map data is released and generation of atomic map updaters that will enable difference update to the new version of the master map data is completed.

The atomic map updater generation unit 113 identifies all the records for atomic map updaters in correspondence to which data other than "NULL" are entered in the "atomic internal category ID" column 910 in the atomic map updater management table 901 (step S2101).

The atomic map updater generation unit 113 executes an atomic map updater processing loop until all the atomic map updaters having been identified in step S2101 are processed (step S2102). In the atomic map updater processing loop, the atomic map updater generation unit 113 targets one of the yet-to-be processed atomic map updaters among the atomic map updaters having been identified in step S2101 (step S2103). It then identifies all the facility category IDs included in the "atomic internal category ID" column 910 in correspondence to the targeted atomic map updater (step S2104). In the category relation table 801, each record with the facility category ID entered in the "base facility category ID" column 802 thereof, matching a facility category ID among the facility category IDs having been identified in step S2104, is identified, and all the facility category IDs entered in the "related facility category" column 803 for these records are obtained. At this time, a single related facility category ID is obtained in correspondence to any overlapping facility category IDs (S2105).

The atomic map updater generation unit 113 identifies each atomic map updater in the atomic map updater management table 901 with any of the related facility category IDs having been obtained in step S2105 entered in the "atomic internal category ID" column 910, which is also set apart from the currently targeted atomic map updater by a distance equal to or less than 20 km, and obtains the atomic map updater IDs of all the atomic map updaters thus identified. At this time, a single atomic map updater ID is obtained in correspondence to any overlapping atomic map updater IDs. As a result, all the related atomic map updaters in "category relation" to the currently targeted atomic map updater designated as the base atomic map updater are identified (step S2106).

The atomic map updater generation unit 113 executes an atomic map updater relation table registration processing loop until all the related atomic map updaters having been obtained in step S2106 are processed (step S2107). In the atomic map updater relation table registration processing loop, a yet-to-be processed related atomic map updater among the related atomic map updaters having been obtained in step S2106 is targeted (step S2108). A record with the ID of the base atomic map updater having been targeted in step S2103 entered in the "base atomic map updater ID" column, with the ID of the related atomic map updater having been targeted in step S2108 entered in the "related atomic map updater ID" column and with the value corresponding to "category relation" entered in the "relation type" column is additionally registered in the atomic map updater relation table 601 by first ensuring that no identical record is already registered (step S2109).

Figure 22:
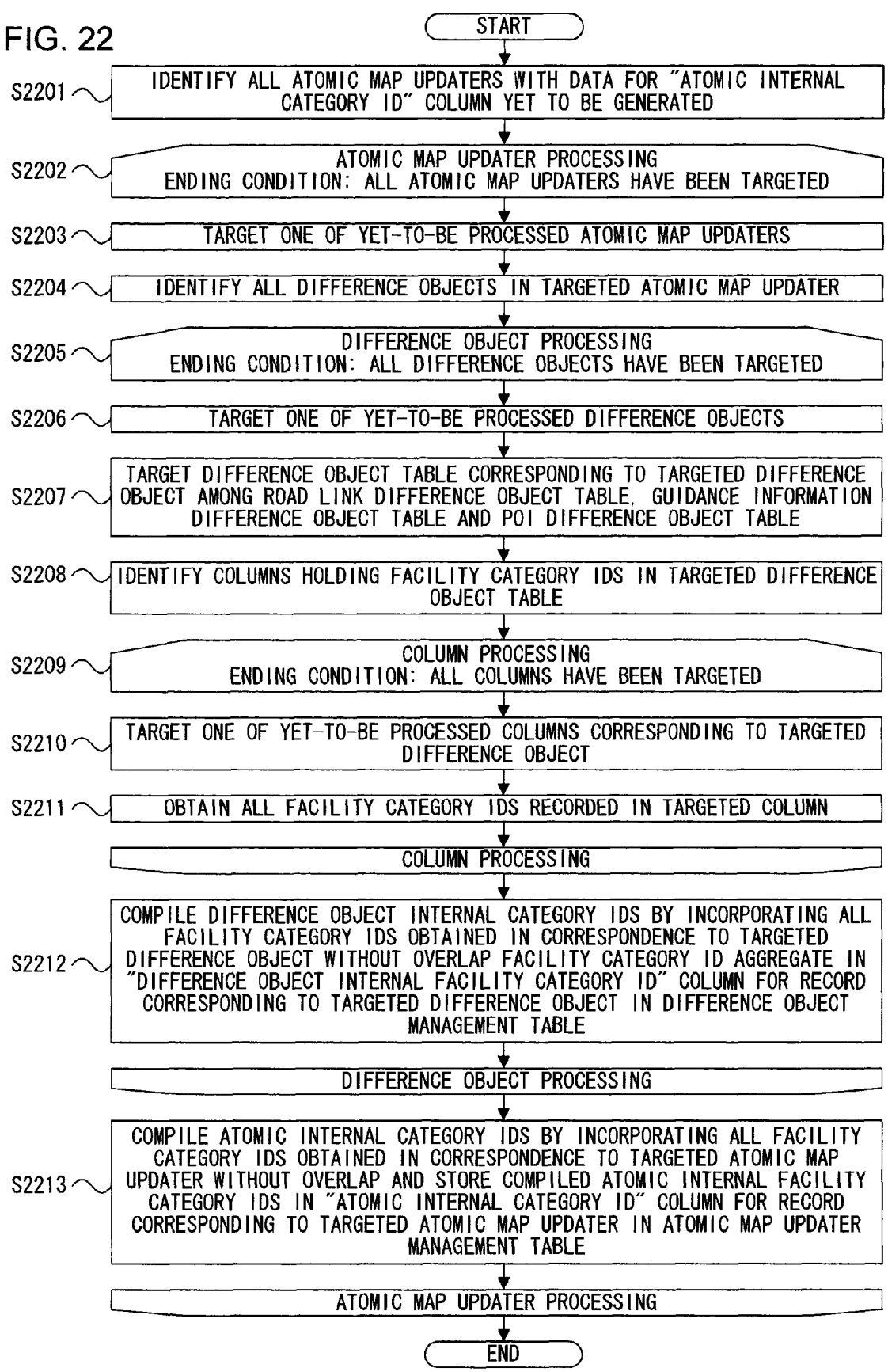
FIG. 22 presents a flowchart of the processing executed to generate data to be stored as atomic internal category data in the atomic map updater management table.

An atomic internal category ID generation flow is now described. FIG. 22 presents a flowchart of the processing executed in the atomic map updater generation unit 113 at the map center 102 in the map update data delivery system in the embodiment when generating data to be stored in the "difference object internal category ID" column 1011 in the difference object management table 1001 and the "atomic internal category ID" column 910 in the atomic map updater management table 901 and updating the contents of these columns with the newly generated data. This processing is executed when a new version of master map data is released and generation of atomic map updaters that will enable difference update to the new version of the master map data is completed.

The atomic map updater generation unit 113 references the atomic map updater management table 901 and identifies all the atomic map updaters in correspondence to which no value has been entered in the "atomic internal category ID" column 910 (step S2201).

The atomic map updater generation unit 113 executes an atomic map updater processing loop until all the atomic map updaters having been identified in step S2201 are processed (step S2202). In the atomic map updater processing loop, one of the yet-to-be processed atomic map updaters is targeted (step S2203) and all the difference objects in the targeted atomic map updater are identified (step S2204).

Until all the difference objects having been identified are processed, the atomic map updater generation unit 113 keeps executing a difference object processing loop (step S2205). In the difference object processing loop, one of the yet-to-be processed difference objects is targeted (step S2206). Among the three difference object tables, i.e., the road difference object table 1101, the guidance information difference object table 1201 and the POI difference object table 1301, the difference object table corresponding to the targeted difference object is then targeted (step S2207). The columns holding facility category IDs in the targeted difference object table are all identified (step S2208).

The atomic map updater generation unit 113 executes a column processing loop until all the identified columns are processed (step S2209). In the column processing loop, one of the yet-to-be processed columns is targeted (step S2210). Each facility category ID recorded in the targeted columns is then obtained (step S2211).

Upon completing the column processing loop for obtaining all the columns holding facility category IDs in the difference object table corresponding to the targeted difference object, the atomic map updater generation unit 113 incorporates all the facility category IDs having been obtained in relation to the currently targeted difference object by handling any overlapping facility category IDs as a single facility category ID, and stores a facility category ID aggregate thus obtained into the "difference object internal facility category ID" column 1011 for the record corresponding to the currently targeted difference object in the difference object management table 1001 (step S2212).

Upon completing the difference object processing loop for obtaining all the facility category IDs in correspondence to all the difference objects included in the targeted atomic map updater, the atomic map updater generation unit 113 incorporates the facility category IDs having been obtained in correspondence to the currently targeted atomic map updater by handling any overlapping facility category IDs as a single facility category ID and stores a facility category ID aggregate thus obtained into the "atomic internal category ID" column 910 for the record corresponding to the currently targeted atomic map updater in the atomic map updater management table 901 (step S2213).

Once the atomic map updater processing loop for processing all the identified atomic map updaters is completed, this processing flow ends.

The screen display is now explained. In reference to FIGS. 23 and 24, operation screens brought up on display at the onboard apparatus 101 in order to enable an update request area entry by the user in step S 1501 in the processing flow in FIG. 15 are described.

Figure 23:
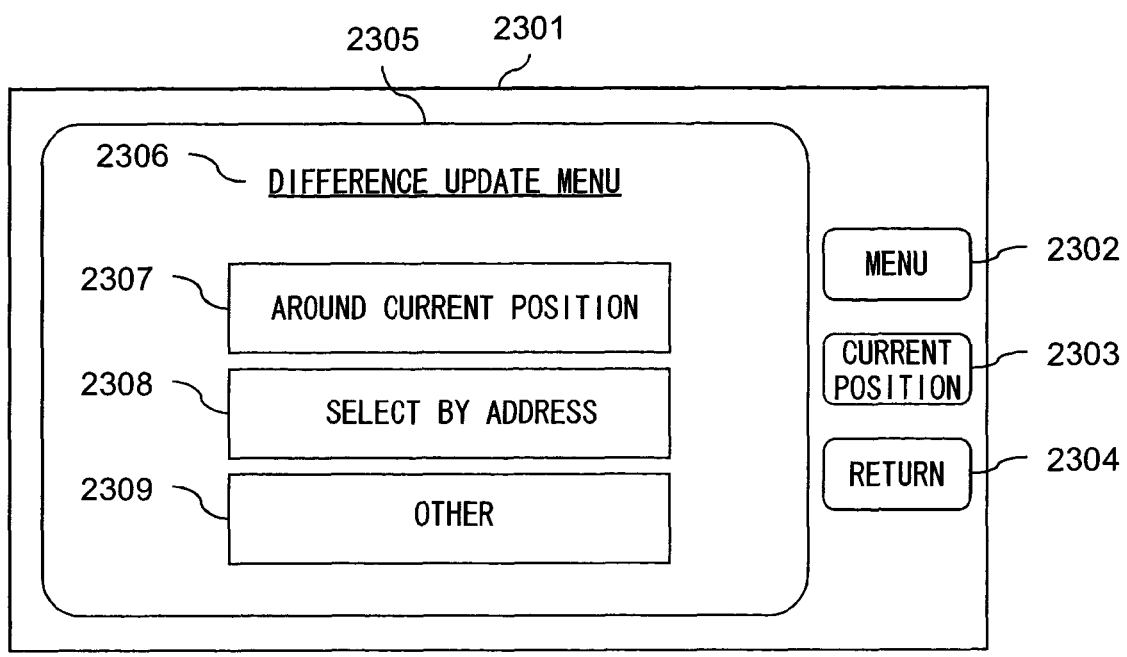
FIG. 23 presents an example of a difference update menu screen that may be brought up on display.

FIG. 23 presents an example of a difference update menu screen that may be brought up to enable a difference update for a small map block ranging over, for instance, a 2 km×2 km area, among navigation menu screens brought up on display at the onboard apparatus 101. In the example presented in FIG. 23, the input unit 103 and the display unit 107 of the onboard apparatus 101 are constituted with a touch panel monitor 2301. The touch panel monitor 2301 includes a touch monitor unit 2305, a menu button 2302, a current position button 2303 and a return button 2304. The menu button 2302 is a hardware switch operated to display a navigation menu screen at the touch monitor unit 2305. The current position button 2303 is a hardware switch operated to bring up on display at the touch monitor unit 2305 a map screen in which the subject vehicle position is superposed. The return button 2304 is a hardware switch operated to return the immediately preceding screen display at the touch monitor unit 2305.

Figure 24:
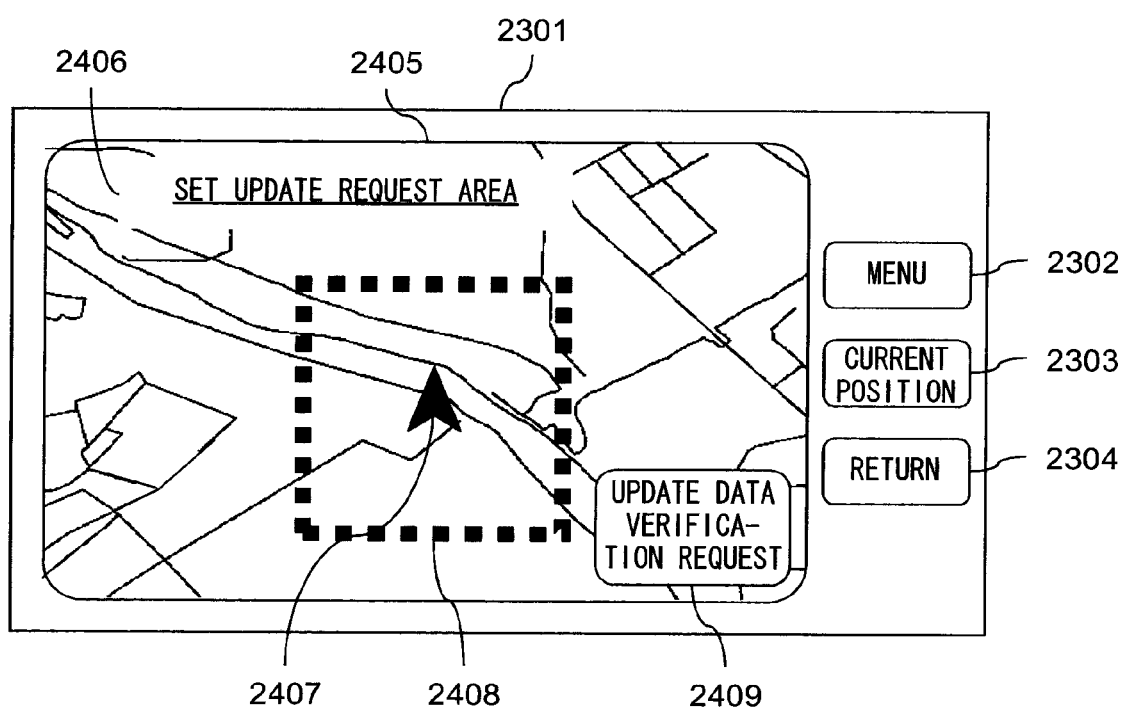
FIG. 24 presents an example of a screen that may be brought up on display to allow an area surrounding the current position to be selected as the update request area.

The contents of the screen displayed at the touch monitor unit 2305 include a character string 2306 that reads "difference update menu" provided as the screen title, an "around current position" button 2307, a "select by address" button 2308 and an "other" button 2309. As the user touches the "around current position" button 2307, an "update request area" setting screen that includes a map of an area around the current position, such as that shown in FIG. 24, is brought up on display and processing for executing difference update of the onboard map data in an area surrounding the current position starts. If the user touches the "select by address" button 2308, a specific menu screen (not shown) is brought up on display and processing for selecting the update target area by its address starts. If the user touches the "other" button 2309, a specific menu screen (not shown) is brought up on display and processing for selecting the update target area through another method starts.

FIG. 24 presents an example of the "update request area" setting screen, which includes the map of an area around the current position, brought up on display when the "around current position" button 2307 is touched. The contents of the screen display brought up at the touch monitor unit 2405 include a character string 2406 that reads "set update request area" provided as the screen title, a subject vehicle mark 2407 indicating the current position and direction of the subject vehicle, a dotted-line rectangle 2408 superimposed over the map to allow the user to visually verify the candidate for the update request area and an "update data verification request" button 2409.

Upon deciding that the area defined by the dotted-line rectangle 2408 on the map displayed at the touch monitor 2405 is the correct update request area, the user touches the "update data verification request" button 2409. An update data verification request message for the area defined by the dotted-line rectangle 2408 designated as the update request area is transmitted to the map center 102 through the communication network 120. If, on the other hand, the user wishes to set another area as the update request area instead of the area defined by the dotted-line rectangle 2408, he moves the area defined by the dotted-line rectangle by scrolling the map and then touches the update data verification request button 2409. The map can be scrolled as the user touches the position he wishes to set as the center of the map, for instance.

Figure 4:
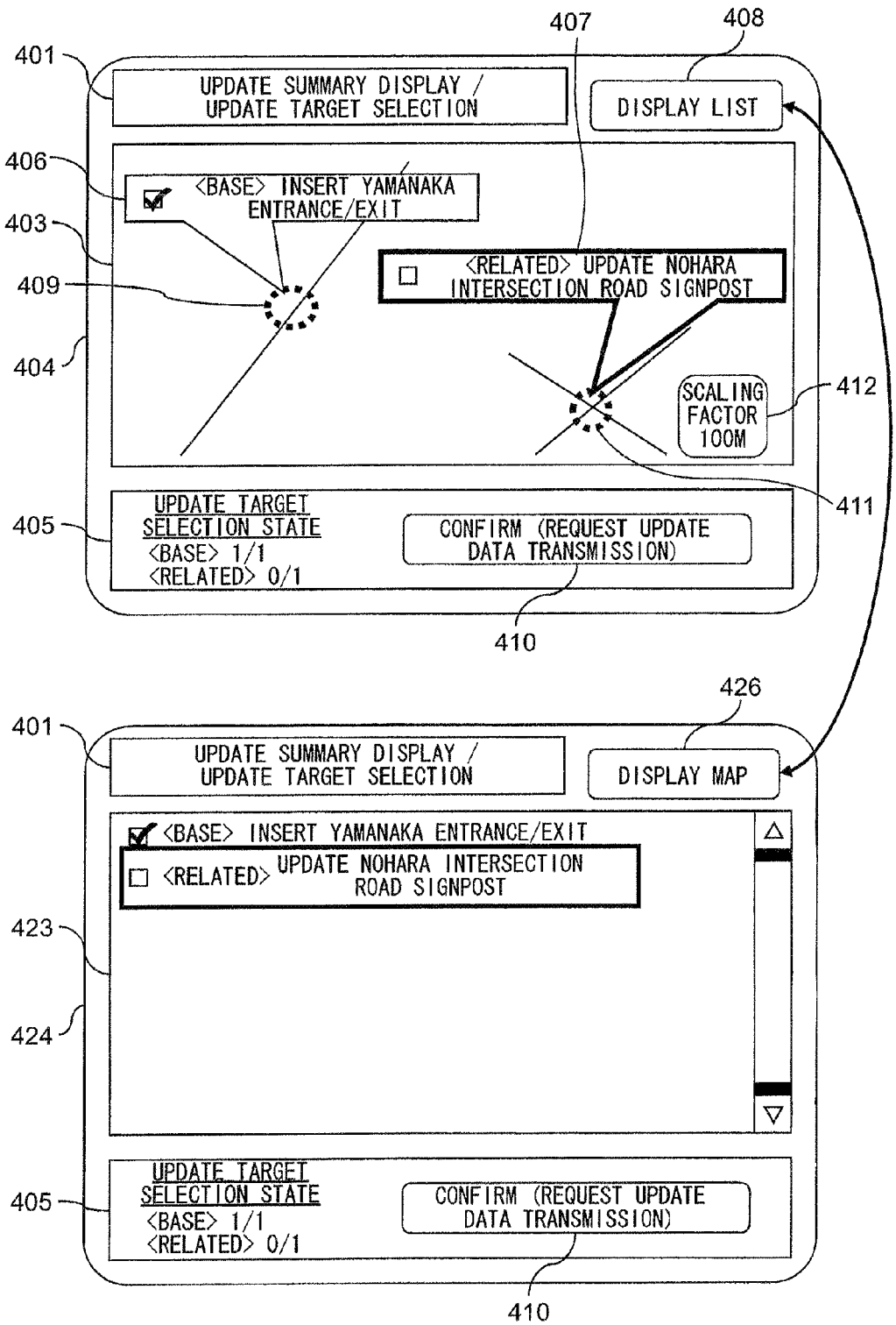
FIG. 4 illustrates update summary display/update target selection screens.

Update summary display/update target selection screen is described. The screen brought up on display in step S1505 in the processing executed in the onboard apparatus 101, as shown in the flowchart presented in FIG. 15, providing an update data summary for the update request area and an operation screen allowing the user to enter a selection instruction indicating the atomic map updaters for which the request for update data body transmission is issued to the map center, is explained below in reference to FIG. 4. A screen 404 brought up on display at the touch monitor unit of the touch panel monitor as shown in FIG. 4 is an "update summary display/update target selection" screen combined with a map display, whereas a screen 424 in FIG. 4 is an "update summary display/update target selection" screen combined with a list display.

In the screen 404, a character string 401 which reads "update summary display/update target selection" provided as the screen title, a "display list" button 408 which the user selects when he wishes to switch to the list display screen, a map display area 403 and an "update target selection state" display area 405 are displayed. As the user touches the "display list" button 408, the "update summary display/update target selection" screen is switched over to the "update summary display/update target selection" screen 424 combined with the list display. While the screen 404 is on display, the user checks the summary information for the base atomic map updaters and the summary information for the related atomic map updaters included in the update data summary, which are displayed at the corresponding positions on the map, and selects each atomic map updater he wishes to designate as a target for the update data body transmission request to be issued to the map center 102 through the processing executed in step S1507 in FIG. 15.

In the map display area 403, a map assuming a predetermined scaling factor and centered on the subject vehicle position is displayed together with, for instance, a scaling factor indicator 412, and the base atomic map updater summary information and the related atomic map updater summary information in the update data summary having been transmitted from the map center 102 are superimposed over the map. It is desirable that a map scroll function and a scaling factor adjustment function be available in the map display area 403. A superimposed display may be achieved by, for instance, displaying dotted-line circles 409 and 411 each indicating the position of an atomic map updater based upon the information indicating the atomic map updater coordinates, included in the summary information, or by displaying text 406 and 407 in the atomic map updater text information included in the summary information together with the dotted-line circles. Each atomic map updater is identified as either a base atomic map updater or a related atomic map updater based upon the base/related identifier flag, and thus, the atomic map updaters are each clearly identified as a base atomic map updater or a related atomic map updater in the display. In the example presented in FIG. 4, text "<base>" or "<related>" is displayed in correspondence to each atomic map updater. In the example presented in FIG. 4, a check box is displayed in correspondence to each atomic map updater so as to allow it to be selected to be included in the update data body transmission request to be issued to the map center 102. In other words, the user is able to indicate whether the particular atomic map updater is selected or not selected by entering a check or not entering a check in the checkbox.

A base atomic map updater, which is indispensable in the execution of the difference update of the map data in the update request area initially specified by the user without missing any map element in the update request area or creating any contradiction, must be selected, unless the user wishes to cancel the update operation itself. Accordingly, a check may be entered in the checkbox for each base atomic map updater as a default setting, i.e., the base atomic map updater may be set in the selected state as a default setting. A related atomic map updater, on the other hand, is not indispensable for a complete and consistent difference update of the map data in the update request area specified by the user, and the user may be allowed to choose either to select or not select the related atomic map updater so as to assure a high level of user convenience.

In the "update target selection state" display area 405, the total numbers of base atomic map updaters and related atomic map updaters that may be selected to be included in the update data body transmission request to the map center 102 and the numbers of currently selected base atomic map updaters and currently selected related atomic map updaters are indicated. In the "update target selection state" display area 405, a "confirm" button 410 is displayed. As the user touches the "confirm" button 410, the base atomic map updaters and related atomic map updaters currently in the selected state are confirmed as the atomic map updaters to be included in the update data body transmission request to be issued to the map center 102 in the processing executed in step S1507 in FIG. 15, and the processing in step S1507 in FIG. 15 is executed accordingly.

The "update summary display/update target selection" display 404 combined with the map display described above enables the user to make a correct decision with respect to the use of the base atomic map updaters, i.e., whether or not the map data update for the "update request area" initially specified by the user is indeed necessary by visually verifying on the map each geographical point to be affected by the update processing for the specified area and also viewing the update details provided as text information. In addition, the user is able to make a correct decision with respect to the need for the use of related atomic map updaters by visually verifying each geographical point on the map to be affected and the update details provided as text information.

The screen 424 is the "update summary display/update target selection" screen combined with a list display. This screen and the screen 404 described earlier have complementary functions. The screen 404 allows the user to quickly ascertain exactly which map positions will be affected by the individual atomic map updaters. The screen 424, in turn, allows the user to ascertain all the atomic map updaters that may be selected with ease by providing a full list of the atomic map updaters. In the screen 424, a character string 401 which reads "update summary display/update target selection" provided as the screen title, a "display map" button 426, which is selected by the user wishing to switch to the map display screen, a list display area 423 and an "update target selection state" display area 405. The character string 401 and the area 405 in the screen 424 are similar to those in the screen 404 described earlier. As the user touches the "display map" button 426 the display mode switches to the screen 404.

In the list display area 423, a complete list of the base atomic map updater summary information and the related atomic map updater summary information included in the update data summary having been received from the map center 102, with one line allocated for providing the information for each atomic map updater, is displayed. The information displayed for each atomic map updater is similar to that displayed in correspondence to each atomic map updater in the map display area 403 explained earlier, and it indicates whether or not the particular atomic map updater is currently selected, indicates whether the atomic map updater is a base atomic map updater or a related atomic map updater and also includes the character string providing the atomic map updater text information for the atomic map updater. The user viewing this "update summary display/update target selection" screen 424 combined with the list display is able to easily ascertain all the atomic map updaters that may be selected.

The above described embodiment is an example and various modifications can be made without departing from the scope of the invention.

What is claimed is:
1. A map update data delivery method, comprising:
storing, in an atomic map updater database of a map update system that updates map data at a terminal, an atomic map updater corresponding to difference update data used to update map data in a specific version to map data in another version for a map element;
receiving an update data verification request which includes identification information of a map area specified by a user of the terminal and a version of map data;
searching the atomic map updater database for a base atomic map updater corresponding to difference update data needed to update a map data for a map element in the map area specified by the user;
generating a first summary information for the base atomic map updater;

searching the atomic map updater database for a related atomic map updater corresponding to other difference update data with a relation to contents included in the base atomic map updater;

generating a second summary information for the related atomic map updater;

transmitting the first summary information for the base atomic map updater and the second summary information for the related atomic map updater to the terminal;

receiving an update data transmission request for difference update data selected by the user based upon the first summary information and the second summary information transmitted to the terminal; and transmitting the difference update data selected by the user to the terminal.

2. A map update data delivery method according to claim 1, wherein:

in the searching for the related atomic map updater, an atomic map updater including another map element set apart from the map element corresponding to the base atomic map updater by a distance equal to or less than a predetermined distance, which includes a character string identical to a character string included in the base atomic map updater, are searched as the related atomic map updater.

3. A map update data delivery method according to claim 1, wherein:

the map update system includes a road link relation information storage unit in which information defining a relation between road link and another road link is stored; and in the searching for the related atomic map updater, an atomic map updater including another map element set apart from the map element corresponding to the base atomic map updater by a distance equal to or less than a predetermined distance, which includes a road link related to a road link included in the base atomic map updater are searched as the related atomic map updater.

4. A map update data delivery method according to claim 1, wherein:

the map update system includes a facility category relation information storage unit in which information defining a relation between a facility category to which a facility belongs and another facility category is stored; and in the searching for the related atomic map updater, an atomic map updater including another map element set apart from the map element corresponding to the base atomic map updater by a distance equal to or less than a predetermined distance, which includes a facility belonging to a facility category related to a facility included in the base atomic map updater are searched as the related atomic map updater.

5. A map update data delivery device that transmits update data to be used to update map data at a terminal connected through a network in response to a request issued from the terminal in a map update system enabling the map data at the terminal to be updated, comprising:

an atomic map updater database in which an atomic map updater corresponding to difference update data used to update map data in a specific version to map data in another version for a map element, are stored;

a base atomic map updater collecting device configured to search the atomic map updater database for a base atomic map updater corresponding to difference update data needed to update a map data for a map element in a map area specified at the terminal and that generates a first summary information for the base atomic map updater;

a related atomic map updater collecting device configured to search the atomic map updater database for a related atomic map updater corresponding to other difference update data with a relation to the base atomic map updater and that generates a second summary information for the related atomic map updater; and a map data output device configured to transmit the first summary information for the base atomic map updater and the second summary information for the related atomic map updater to the terminal when receiving an update data verification request which includes identification information of a map area specified by a user of the terminal and a version of map data, and, when receiving an update data transmission request for difference update data selected by the user based upon the first summary information and the second summary information transmitted to the terminal, to transmit the difference update data selected to the terminal.

6. A map update data delivery device according to claim 5, wherein:

the related atomic map updater collecting device searches the related atomic map updater including another map element set apart from the map element corresponding to the base atomic map updater by a distance equal to or less than a predetermined distance, which includes a character string identical to a character string included in the base atomic map updater.

7. A map update data delivery device according to claim 5, further comprising:

a road link relation information storage unit in which information defining a relation between a road link and another road link is stored, wherein:

the related atomic map updater collecting device searches the related atomic map updater including another map element set apart from the map element corresponding to the base atomic map updater by a distance equal to or less than a predetermined distance, which includes a road link related to a road link included in the base atomic map updater.

8. A map update data delivery device according to claim 5, further comprising:

a facility category relation information storage unit in which information defining a relation between a facility category to which a facility belongs and another facility category is stored, wherein:

the related atomic map updater collecting device searches the related atomic map updater including another map element set apart from the map element corresponding to the base atomic map updater by a distance equal to or less than a predetermined distance, which includes a facility belonging to a facility category related to a facility included in the base atomic map updater.

9. A terminal device, comprising:

a map data acquisition unit that obtains map data in a specific version stored in a map database; and a map update processing unit that updates the map data in the specific version to map data in another version in correspondence to each map element obtained via the map data acquisition unit, wherein:

the map data acquisition unit transmits to a map center an update data verification request that includes identification information of a map area specified by a user via an input unit and information indicating a version of map data, receives a first summary information for a base atomic map updater corresponding to difference update data needed to update a map element in the map area specified, and a second summary information for a related atomic map updater corresponding to difference update data with a relation to the base atomic map updater, the first summary information for the base atomic map updater and the second summary information for the related atomic map updater are generated and transmitted by the map center, displays the first summary information and the second summary information at a display unit, accepts an input for selecting difference update data requested for transmission, transmits an update data transmission request for difference update data selected by the user to the map center, and obtains the difference update data; and the map update processing unit updates the map data stored in the map database by using the difference update data obtained by the map data acquisition unit.

10. A terminal device according to claim 9, wherein:

the first summary information for the base atomic map updater and the second summary information for the related atomic map updater and current selection states of both the first summary information and the second summary information are displayed at the display unit.

11. A terminal device according to claim 9, wherein:

the related atomic map updater includes another map element set apart from the map element corresponding to the base atomic map updater by a distance equal to or less than a predetermined distance, which includes a character string identical to a character string included in the base atomic map updater.

12. A terminal device according to claim 9, wherein:

the related atomic map updater includes another map element set apart from the map element corresponding to the base atomic map updater by a distance equal to or less than a predetermined distance, which includes another road link a relation of which to a road link included in the base atomic map updater is defined.

13. A terminal device according to claim 9, wherein:

the related atomic map updater includes another map element set apart from the map element corresponding to the base atomic map updater by a distance equal to or less than a predetermined distance, which includes a facility belonging to another facility category a relation of which to a facility category to which a facility included in the base atomic map updater belongs is defined.

* * * * *